United States Patent
Tsuboi et al.

(10) Patent No.: US 10,408,662 B2
(45) Date of Patent: Sep. 10, 2019

(54) WATER AMOUNT MEASUREMENT DEVICE AND WATER AMOUNT MONITORING SYSTEM

(71) Applicant: FUJITSU LIMITED, Kawasaki-shi, Kanagawa (JP)

(72) Inventors: Osamu Tsuboi, Kawasaki (JP); Michio Ushigome, Atsugi (JP); Yoshio Kikuchi, Ninomiya (JP); Ryozo Takasu, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 15/584,484

(22) Filed: May 2, 2017

(65) Prior Publication Data

US 2017/0234717 A1 Aug. 17, 2017

Related U.S. Application Data

(63) Continuation of application No. PCT/JP2014/080940, filed on Nov. 21, 2014.

(51) Int. Cl.
*G01F 23/292* (2006.01)
*G01F 1/66* (2006.01)
*G01B 11/02* (2006.01)

(52) U.S. Cl.
CPC .......... *G01F 23/292* (2013.01); *G01F 1/661* (2013.01); *G01F 23/2928* (2013.01); *G01B 11/026* (2013.01)

(58) Field of Classification Search
CPC .................................................... G01F 23/292
USPC ............................................................ 73/293
See application file for complete search history.

(56) References Cited

FOREIGN PATENT DOCUMENTS

| EP | 0953827 A1 | 11/1999 |
|---|---|---|
| JP | H09-250903 A | 9/1997 |
| JP | 2001-082921 A1 | 3/2001 |
| JP | 2002-107204 A | 4/2002 |
| JP | 2002-350130 A1 | 12/2002 |
| JP | 2005-249453 A1 | 9/2005 |

(Continued)

OTHER PUBLICATIONS

Murayama. Translation of JP2001082921. Pub. Mar. 2001. Translated Dec. 2018. (Year: 2001).*

(Continued)

*Primary Examiner* — Walter L Lindsay, Jr.
*Assistant Examiner* — Philipmarcus T Fadul
(74) *Attorney, Agent, or Firm* — Kratz, Quintos & Hanson, LLP

(57) ABSTRACT

A water amount measurement device includes a light emitting element to emit light, a light receiving element to receive the light reflected by a liquid surface and by a liquid bottom at a bottom surface within a pipeline, a storage to store a distance from the light emitting element to the liquid bottom, and a processor. The processor computes a water level of the liquid flowing through the pipeline according to different formulas depending on whether a comparison result of distance data obtained based on an output signal of the light receiving element, and the distance at a time of measurement, includes a component corresponding to a distance exceeding the distance generated by the reflection from the liquid bottom, or the comparison result includes a component corresponding to a distance less than the distance generated by the reflection from the liquid surface.

17 Claims, 19 Drawing Sheets

(56) References Cited

FOREIGN PATENT DOCUMENTS

| JP | 2006-258579 A1 | 9/2006 |
| JP | 2011-013084 A | 1/2011 |
| JP | 2011-042943 A1 | 3/2011 |
| JP | 2012-202794 A1 | 10/2012 |
| JP | 2014-190710 A | 10/2014 |

OTHER PUBLICATIONS

Fujikawa. Translation of JP2002350130. Pub. Dec. 2002. Translated Dec. 2018. (Year: 2002).*
Yamamoto. Translation of JP2005249453. Pub. Sep. 2005. Translated Dec. 2018. (Year: 2005).*
Yuichi. Translation of JPH09250903. Pub. Sep. 1997. Translated Dec. 2018. (Year: 1997).*
Office Action issued with respect to the corresponding Japanese Patent Application No. 2016-559771, dated May 15, 2018 (10 Sheets).
Office Action of Japanese Patent Application No. 2016-559771 dated Sep. 11, 2018 (3 pages, 4 pages translation, 7 pages total).
International Search Report for International Application No. PCT/JP2014/080940 dated Feb. 3, 2015.
Written Opinion of the International Searching Authority for International Application No. PCT/JP2014/080940 dated Feb. 3, 2015 (5 Sheets, 2 Sheets translation, 7 Sheets total).

* cited by examiner

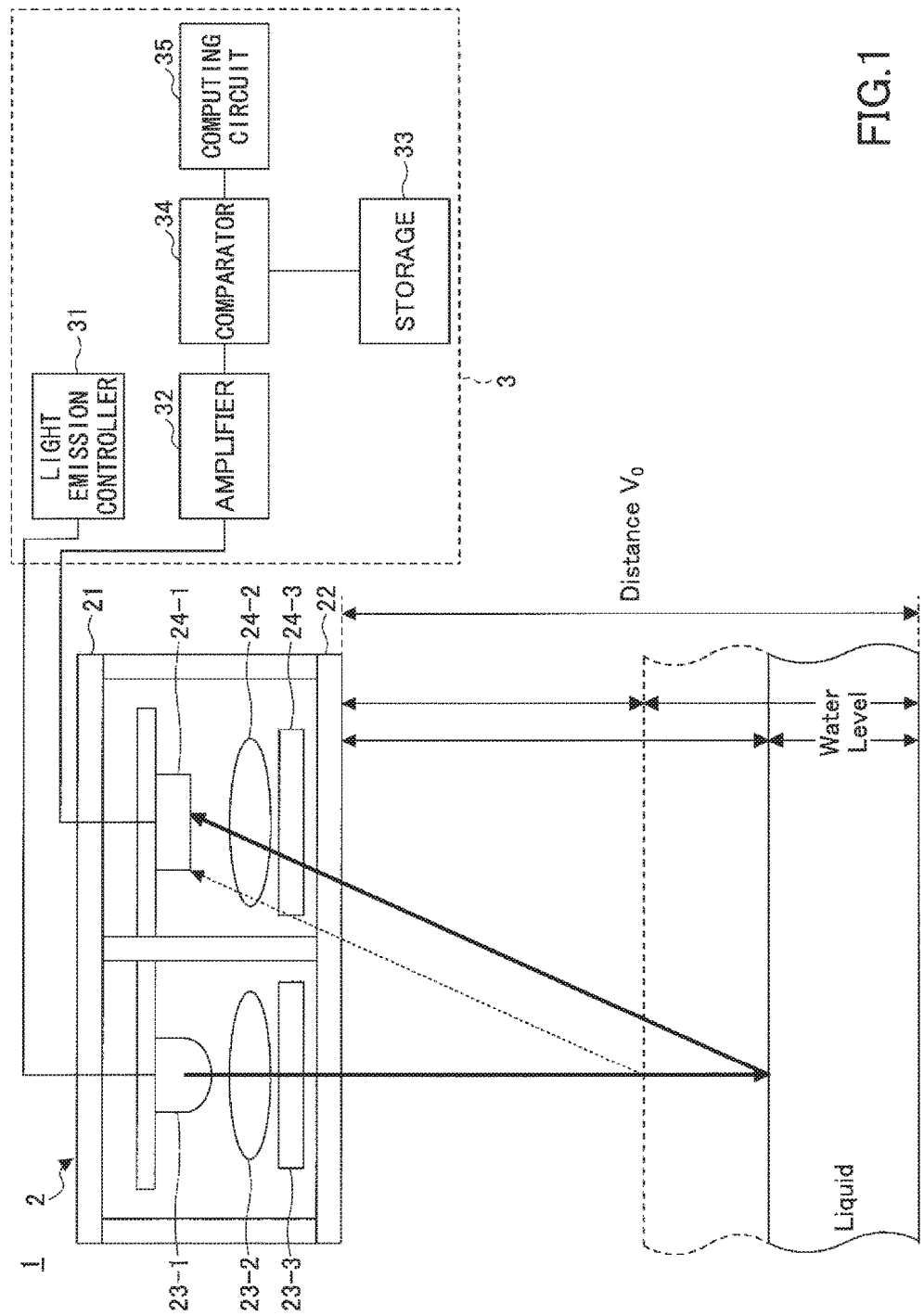

FIG.2A
FIG.2B
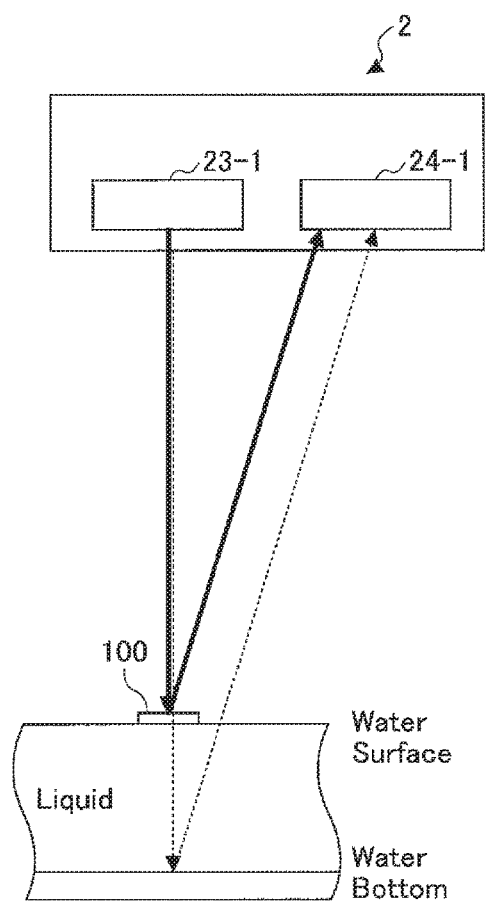
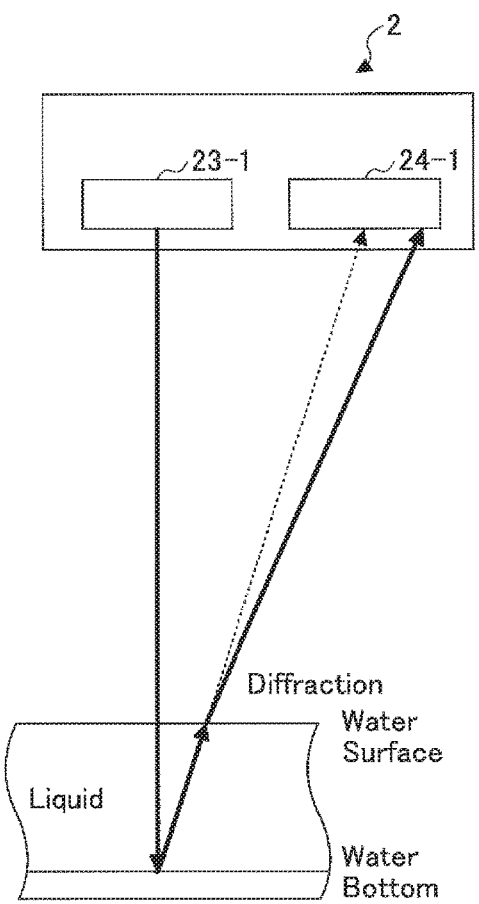

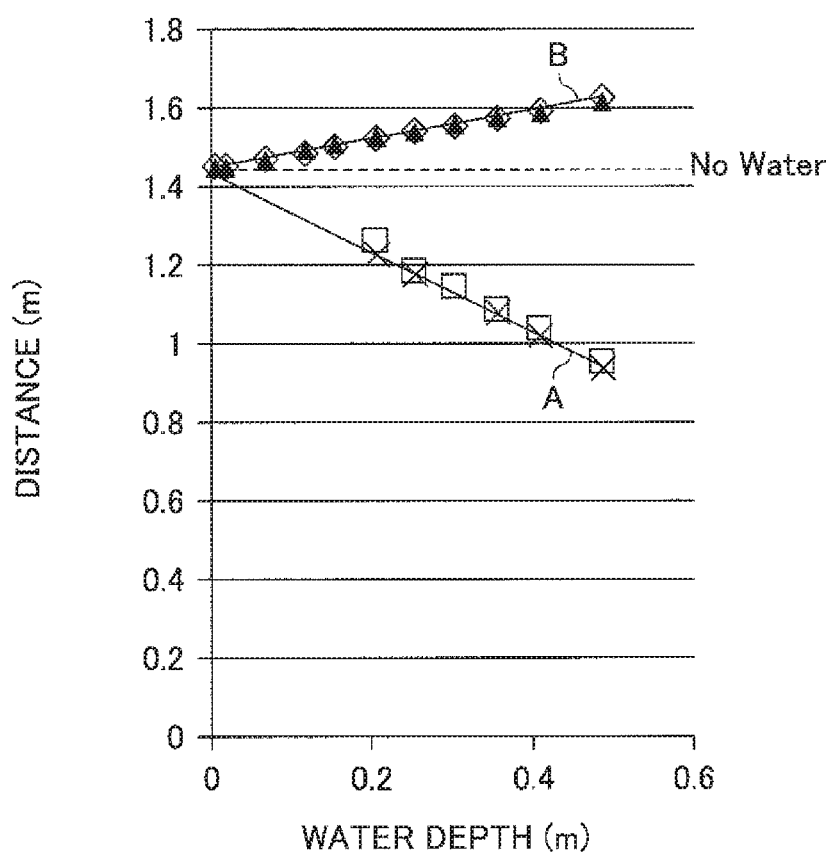

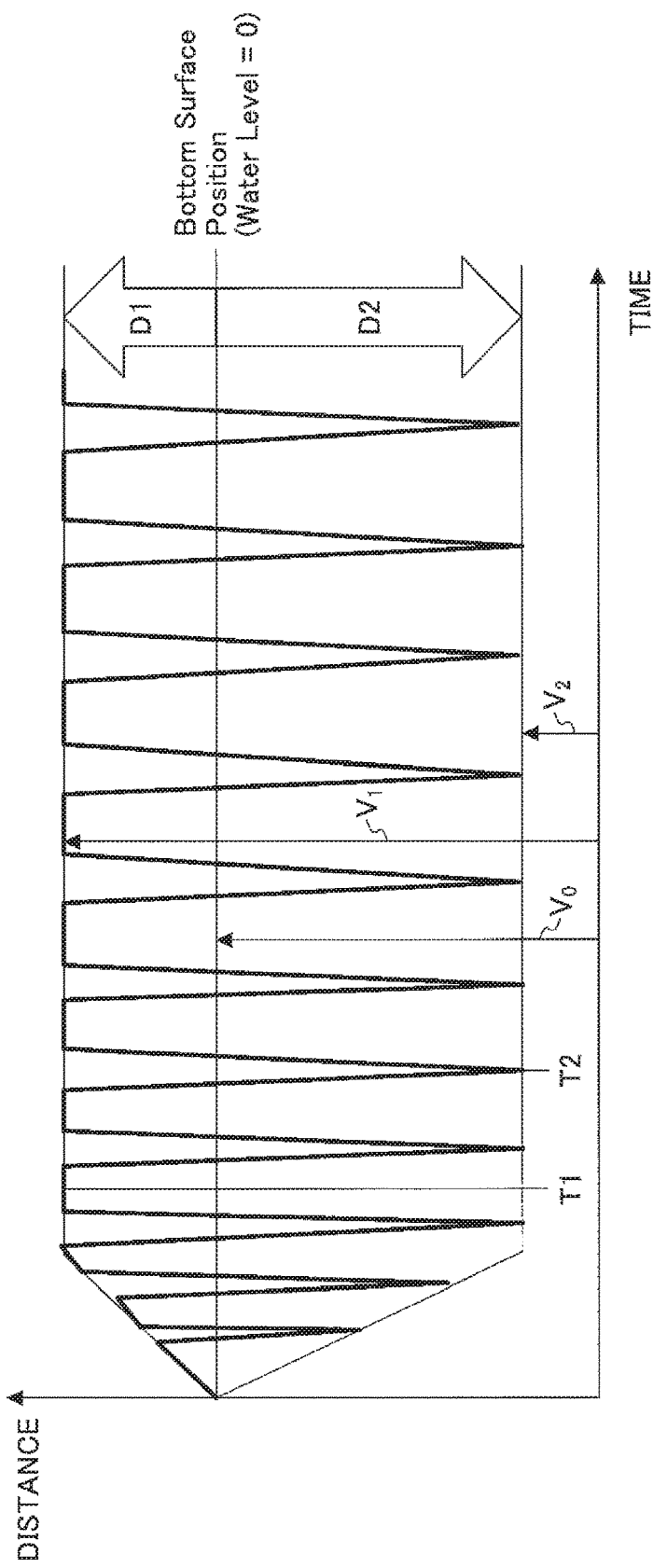

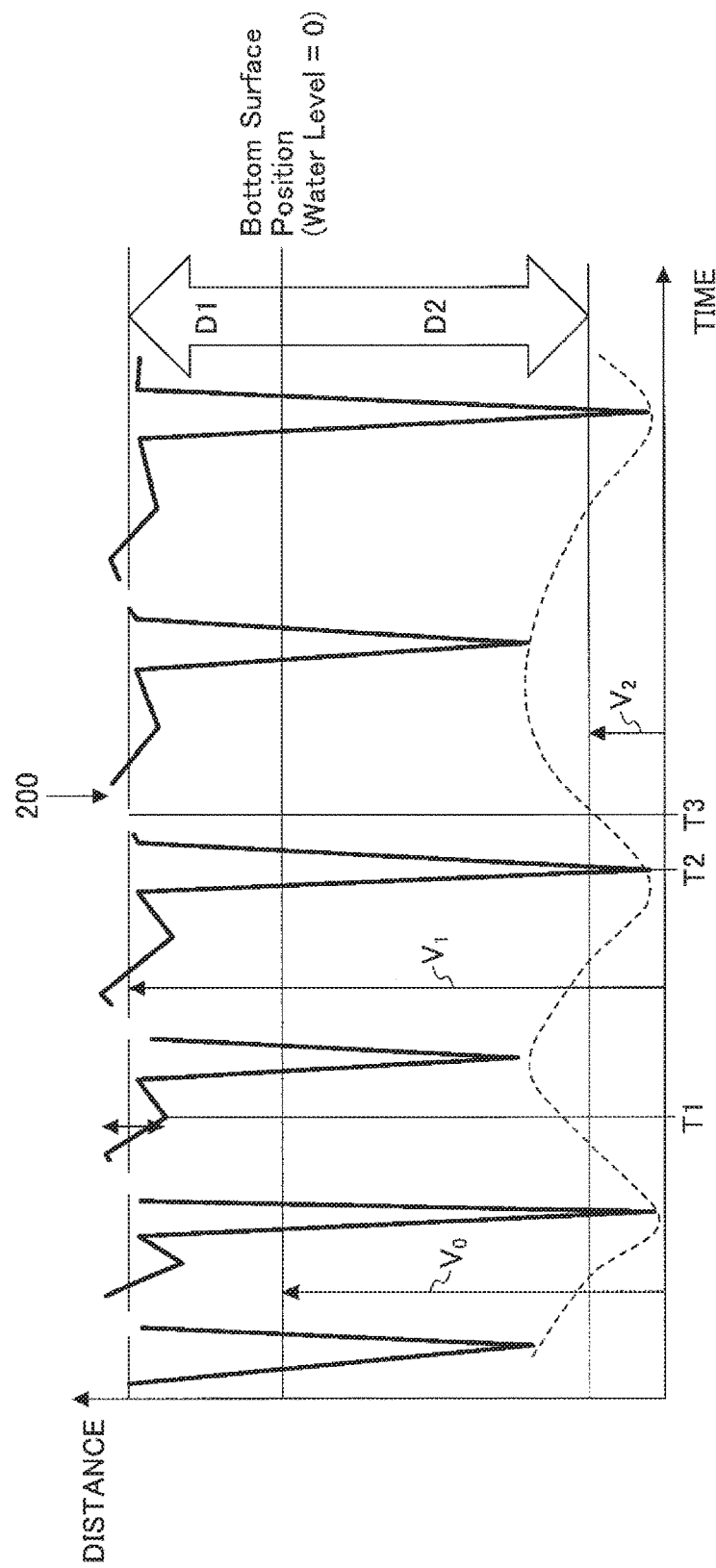

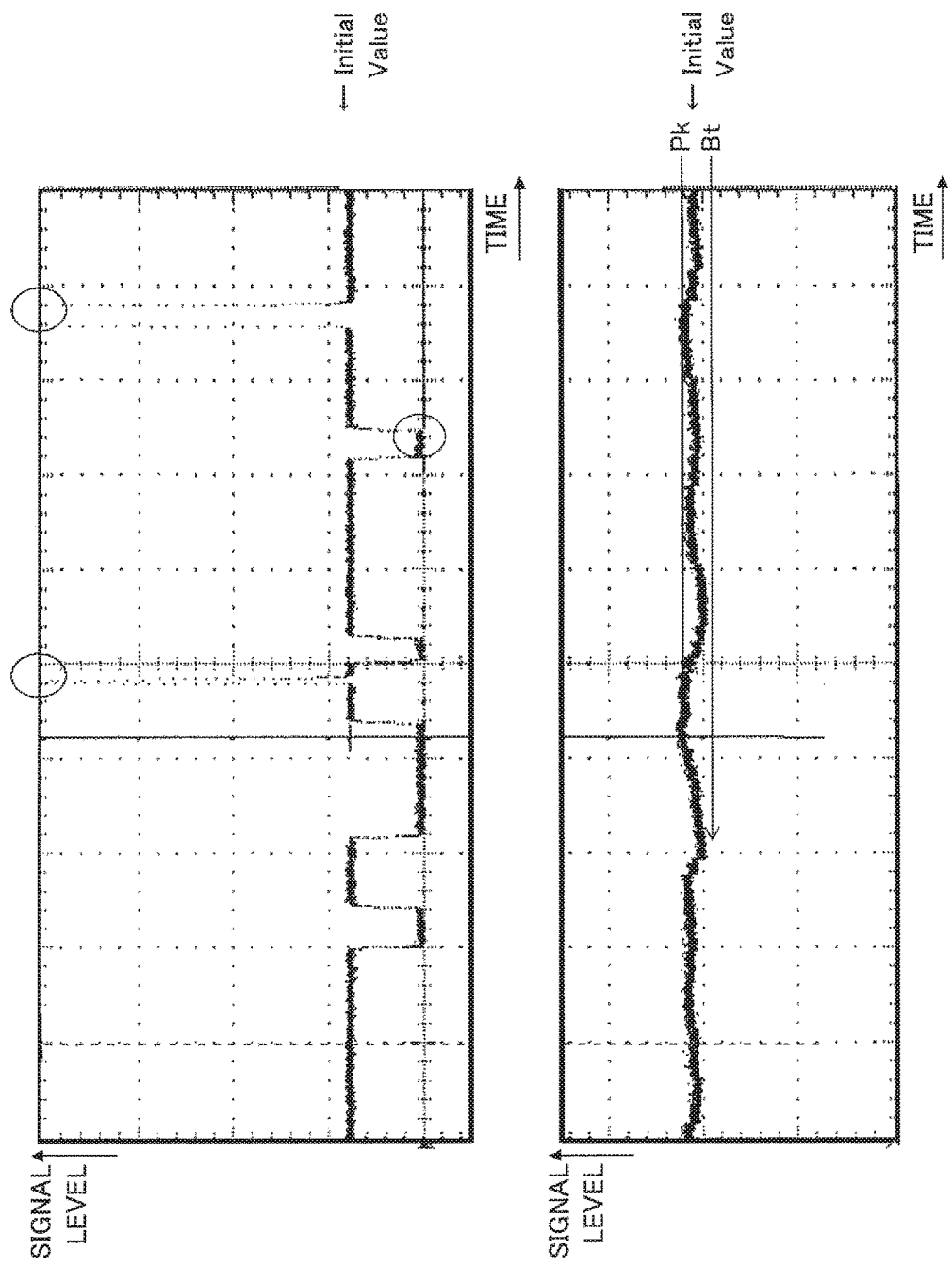

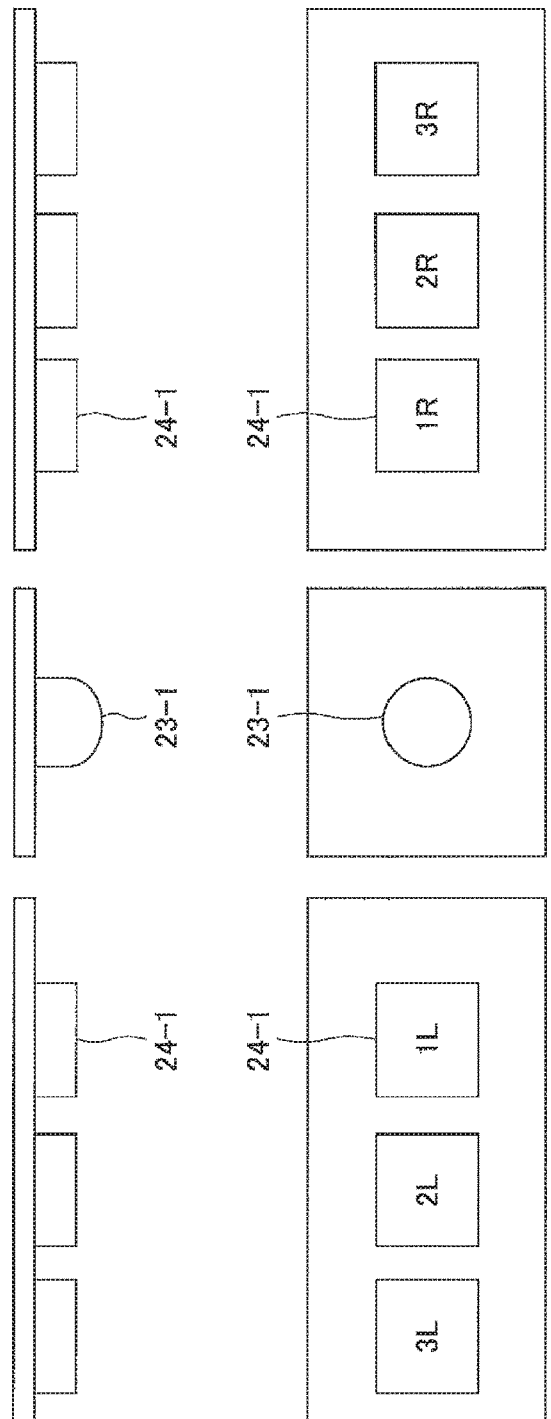

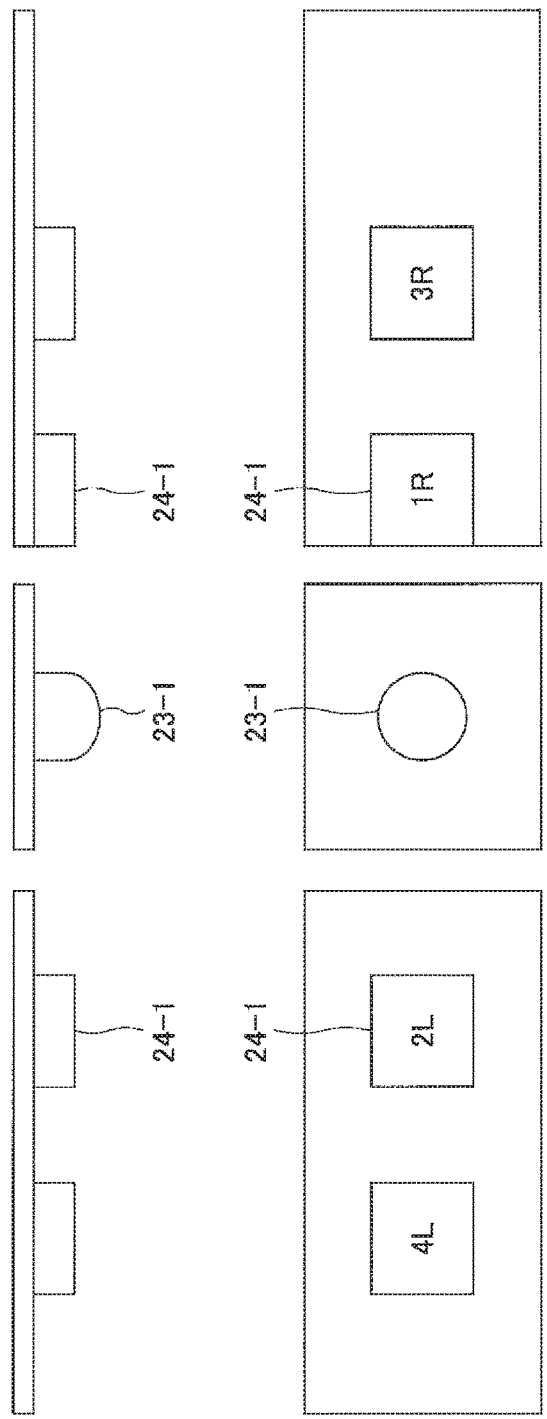

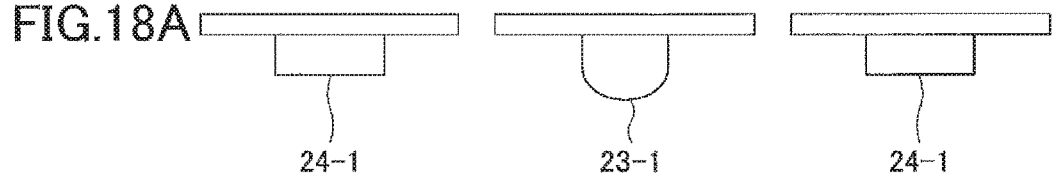
FIG.18A
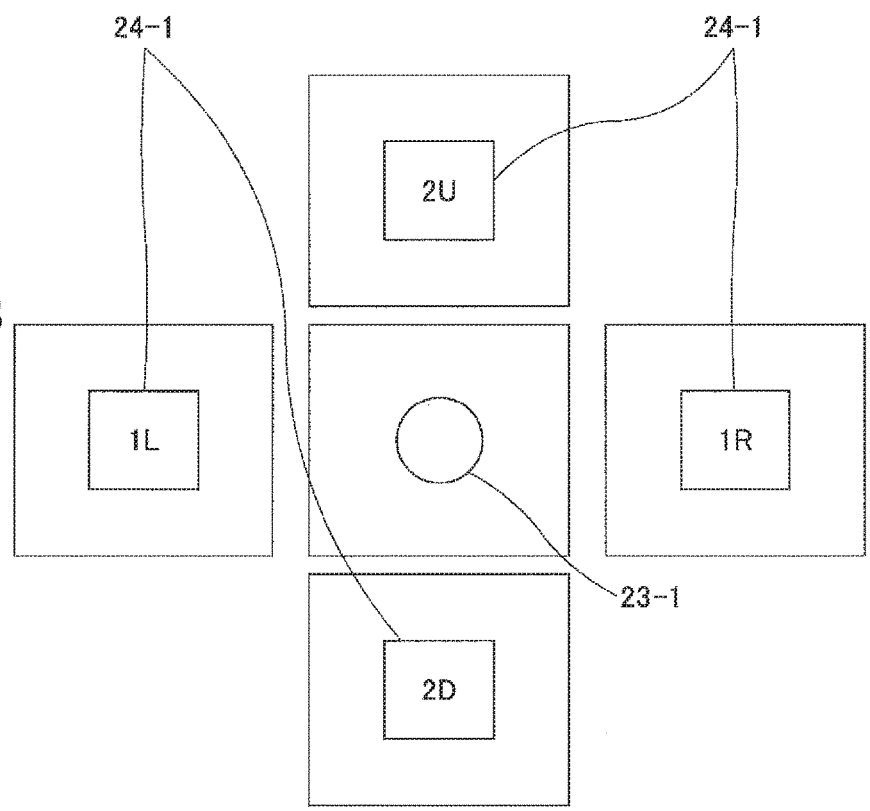
FIG.18B
FIG.19
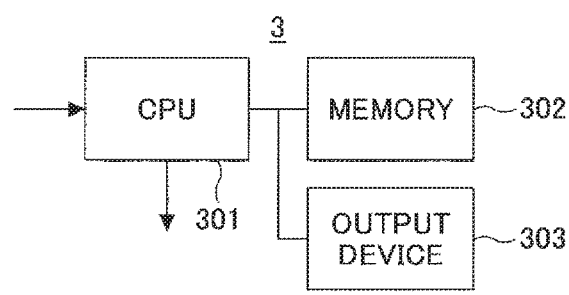

WATER AMOUNT MEASUREMENT DEVICE AND WATER AMOUNT MONITORING SYSTEM

CROSS-REFERENCE TO RELATED APPLICATIONS

This application is a continuation application of International Application No. PCT/JP2014/080940 filed on Nov. 21, 2014 and designated the U.S., the entire contents of which are incorporated herein by reference.

FIELD

The embodiments discussed herein are related to a water amount measurement device and a water amount monitoring system for measuring a water level or the like in a sewage manhole, for example.

BACKGROUND

Recently, due to causes such as global warming, shifts in intercontinental air flow, or the like, localized torrential rain and guerilla-type heavy rain frequently occur at various parts of the world, and there are concerns of flood damage. In addition, particularly in urban areas, the rainfall infiltration to the earth is decreasing, and the volume of wastewater is increasing. The sewage has a function to quickly drain the rain water to rivers or the like.

The sewage pipeline is embedded underground, however, a vertical hole into which a person can enter, called a manhole, is provided at predetermined intervals (for example, for every several tens of meters) to enable maintenance, inspection, and management of the sewage pipeline. Domestic wastewater, rain water, or the like flow through the sewage pipeline, but a flow rate of the rain water or the like flowing through the sewage pipeline is not constant, and differs depending on the time and day. In order not to exceed the flow rate of the rain water or the like set for the rainfall, flooding to a reservoir or pumping up by a pump is carried out depending on the situation, to thereby prevent internal flooding from the manhole. The water amount, such as the water level, the flow velocity, and the flow rate, is monitored at a junction of the sewage pipelines to manage the drainage, however, there are cases in which it is impossible to sufficiently cope with the localized torrential rain and the guerilla-type heavy rain. As a result, the internal flooding cannot be prevented in some cases.

For this reason, multi-point monitoring of the water levels or the like are desired at manholes provided further on the upstream side in a wider area. However, when multiple monitoring points are provided, it requires considerable cost to set up the water level sensors or the like and to operate the multi-point monitoring system. Consequently, there are demands for an inexpensive water amount measurement device having relatively long maintenance intervals.

Conventionally, the water level of the sewage pipeline or the like is generally judged by measuring the water level using the water level sensor. This is because a dangerous state of the manhole first appears as a change in the water level. In other words, when the water level is measured, it becomes possible to find out a cross sectional area of the passing liquid, such as the rain water. In addition, the flow velocity of the liquid can be predicted from a gradient of a pipeline, and an indication of the flow rate of rain water or the like flowing per unit time can be obtained. The generally used water level sensor includes a pressure type water level sensor, and an ultrasonic type water level sensor.

The pressure type water level sensor is set within the liquid, and obtains a water depth based on a pressure difference from atmospheric pressure. However, the pressure type water level sensor is affected by the atmospheric pressure, and the pressure increases due to velocity head according to Bernoulli's law in a case in which the liquid flows. As a result, errors are caused thereby, such as an error generated in a direction in which the water level is detected as being higher than an actual level. In addition, there are restrictions on the usage of the pressure type water level sensor, in that the pressure type water level sensor needs to be set within the liquid. Further, the pressure type water level sensor requires a casing that can withstand a poor environment of the sewage, particularly, the wastewater, and a relatively long wiring for a power supply and signals. The pressure type water level sensor also requires a relatively expensive installation work, and frequent cleaning. For these reasons, it requires considerable cost to set up and operate the pressure type water level sensor. On the other hand, a reducing mechanism for reducing the cross sectional area of the pipeline may be provided, and the pressure type water level sensor may be formed at stages before and after the reducing mechanism. In this case, the water level and the flow rate can be obtained simultaneously according to Bernoulli's law. However, in a case in which the pipeline is the sewage pipeline, dirt may adhere on the reducing mechanism and deteriorate functions of the reducing mechanism. Accordingly, it is undesirable to provide the reducing mechanism in the sewage pipeline.

The ultrasonic type water level sensor measures a time it takes for ultrasonic waves transmitted from a transmitter to be reflected by the water surface and received by a receiver, and obtains the water depth by making a non-contact measurement of the distance to the water surface. In the case of the ultrasonic type water level sensor, it is necessary to correct effects of the temperature on the sound velocity. However, because it is possible to make the non-contact measurement of the distance to the water surface, the set-up and operation costs of the ultrasonic type water level sensor can be reduced when compared to those of the pressure type water level sensor. On the other hand, inside the manhole that is approximately 1 m in diameter and approximately 10 m in depth, the ultrasonic waves transmitted from the ultrasonic type water level sensor undergo irregular or diffuse reflection at a sidewall defining the manhole, to make an accurate measurement difficult. In addition, the ultrasonic type water level sensor requires water-proofing and damp-proofing in order to withstand high-humidity conditions. Consequently transmission and reception efficiencies of the transmitter receiver deteriorate, and it requires a relatively high power to make the measurement from a position that is approximately 10 m from the water surface. For these reasons, there are restrictions on the usage of the ultrasonic type water level sensor, in that the ultrasonic type water level sensor needs to be set at a position in a vicinity of the water surface of a relatively wide pipeline. The ultrasonic transmitter receiver may be set within the pipeline, and the ultrasonic waves may be caused to propagate through the liquid. In this case, the flow of the liquid varies the ultrasonic frequency according to the Doppler shift, and the flow rate of the liquid can be measured from an amount of change of the ultrasonic frequency. But in this case, there are restrictions on the usage of the ultrasonic type water level sensor, in that the ultrasonic type water level sensor needs to be set within the liquid, and the non-contact measurement of the water level is no longer possible. Moreover, in this case, the ultrasonic type water level sensor needs to be extra water-resistant. Further, because a density of a medium excited by the ultrasonic waves changes from that of air to that of a liquid such as water, a relatively high excitation energy is required, and consequently, the required power considerably increases.

As another method, there is a proposed method that measures the water level of the river using an optical distance sensor (for example, refer to related art, Japanese Laid-Open Patent Publication No. 2006-258579). Methods employed by the optical distance sensor include a triangulation measuring method that irradiates a light spot of laser light or the like onto a measurement target and performs a triangulation from a position where reflected light is detected, and a TOF (Time Of Flight) measuring method that measures reflection times of optical pulses. However, according to each of these methods, a part of the irradiated light reflects at the water surface, while most part of the irradiated light is transmitted through the liquid, and it is difficult to stably measure the liquid surface of the liquid through which the light is transmitted. That is, there is a case in which the detected reflected light is caused by the reflection from the water surface, and a case in which the detected reflected light is caused by the reflection from a water bottom (or foreign matter within the water). The former case is correlated to a correct water surface position, while the latter case does not reflect the water surface position. In the later case, the light undergoes refraction as the light from within the water exits to the air, and the reflected light becomes correlated to a water bottom position that is deeper that the actual water bottom.

There is a proposed method that floats a suspended solid, such as a float, at the liquid surface of the liquid through which light is transmitted, when measuring the liquid surface of the liquid using the optical distance sensor. This proposed method irradiates light towards the float, to stably measure the distance to the liquid surface. However, the float is required to withstand the poor environment of the sewage, particularly, the wastewater, for a relatively long time, and the float requires frequent cleaning. As a result, original advantages of making the non-contact measurement of the water level become no longer obtainable. In addition, it is difficult to measure the flow rate of the liquid by the methods that use the optical distance sensor.

Other related art includes Japanese Laid-Open Patent Publication No. 2012-202794, and Japanese Laid-Open Patent Publication No. 2011-42943, for example.

According to the conventional water level sensors, there are considerably restrictions on the usage, and it is difficult to accurately make a non-contact measurement of the water amount, such as the water level.

SUMMARY

Accordingly, it is an object in one aspect of the embodiments to provide a water amount measurement device and a water amount monitoring system, which can accurately make a non-contact measurement of the water amount, such as the water level.

According to one aspect of the embodiments, there is provided a water amount measurement device configured to measure a water level of a liquid flowing within a pipeline, including a light emitting element configured to irradiate light on a liquid surface of the liquid; a light receiving element configured to receive light reflected by the liquid surface and light reflected by a liquid bottom of the liquid at a bottom surface within the pipeline; a storage configured to store a distance $V_0$ from the light emitting element to the liquid bottom within the pipeline; and a processor configured to compute a water level $D_1$ using $V_1-V_0$, where $V_1$ denotes a distance represented by an average value of an upper envelope of distance data obtained based on an output signal of the light receiving element, when a comparison result of the distance data and the distance $V_0$ at a time of measuring the water level includes a first signal component corresponding to a distance exceeding the distance $V_0$ generated by the reflection from the liquid bottom within the pipeline, and compute the water level $D_2$ using $V_0-V_2$, where $V_2$ denotes a distance represented by an average value of a lower envelope of the distance data, when the comparison result includes a second signal component corresponding to a distance less than the distance $V_0$ generated by the reflection from the liquid surface.

According to another aspect of the embodiments, there is provided a water amount measuring system that includes a water amount measurement device described above, and a server that is notified of measurement information including at least the water level from the water amount measurement device and aggregates the measurement information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram schematically illustrating an example of a water amount measurement device in one embodiment;

FIGS. 2A and 2B are schematic diagrams for explaining a water bottom measuring method;

FIG. 3 is a diagram illustrating measured results of a distance from a sensor module to the water bottom measured by the measuring methods of FIGS. 2A and 2B;

FIG. 4 is a diagram for explaining a case in which waves at a water surface are gentle;

FIG. 6 is a diagram for explaining a case in which the waves at the water surface are rough;

FIGS. 8A and 8B are diagrams illustrating results of experiments in a case in which waves are generated at the water surface;

FIGS. 15A and 15B are diagrams respectively illustrating a side view and a plan view of the light emitting element and the light receiving elements in a fifth example of the arrangement;

FIGS. 16A and 16B are diagrams respectively illustrating a side view and a plan view of the light emitting element and the light receiving elements in a sixth example of the arrangement;

FIGS. 18A and 18B are diagrams respectively illustrating a side view and a plan view of the light emitting element and the light receiving elements in an eighth example of the arrangement;

FIG. 19 is a block diagram illustrating another example of a control module;

DESCRIPTION OF EMBODIMENTS

Figure 5A:
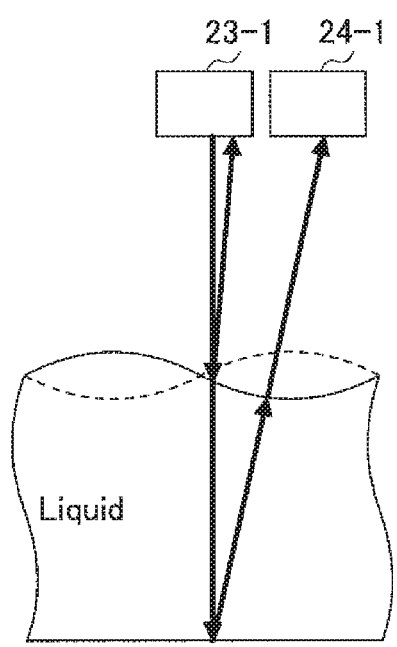
FIGS. 5A and 5B are diagrams for explaining a reflection at the water bottom and a regular reflection at the water surface in the case in which the waves at the water surface are gentle.

Preferred embodiments of the present invention will be described with reference to the accompanying drawings.

In one embodiment, a water amount measurement device is configured to measure a water level of a liquid flowing within a pipeline, and includes a light emitting element configured to irradiate light on a liquid surface of the liquid, a light receiving element configured to receive light reflected by the liquid surface and light reflected by a liquid bottom of the liquid at a bottom surface within the pipeline, a storage configured to store a distance $V_0$ from the light emitting element to the liquid bottom within the pipeline, and a processor. The processor is configured to compute a water level $D_1$ using $V_1-V_0$, where $V_1$ denotes a distance represented by an average value of an upper envelope of distance data obtained based on an output signal of the light receiving element, when a comparison result of the distance data and the distance $V_0$ at a time of measuring the water level includes a first signal component corresponding to a distance exceeding the distance $V_0$ generated by the reflection from the liquid bottom within the pipeline, and compute the water level $D_2$ using $V_0-V_2$, where $V_2$ denotes a distance represented by an average value of a lower envelope of the distance data, when the comparison result includes a second signal component corresponding to a distance less than the distance $V_0$ generated by the reflection from the liquid surface.

A description will now be given of the water amount measurement device and the water amount measuring system in each embodiment according to the present invention.

In this specification, "water amount" is not limited to "an amount of water", and includes "an amount of transparent or semitransparent liquid (or liquid amount)". In addition, the water amount includes a water level, a flow velocity, a flow rate, or the like.

FIG. 1 is a diagram schematically illustrating an example of the water amount measurement device in one embodiment. As illustrated in FIG. 1, a water amount measurement device 1 includes a sensor module 2 that is an example of an optical distance sensor, and a control module 3 that is an example of a computer (or control means).

The sensor module 2 includes a casing 21, an optical window 22, and a light emitting optical system 23 and a light receiving optical system 24 that are arranged within a space sealed by the casing 21 and the optical window 22. The light emitting optical system 23 includes a light emitting element 23-1, a lens 23-2, and an optical filter 23-3. The light receiving optical system 24 includes a light receiving element 24-1, a lens 24-2, and an optical filter 24-3.

The casing 21 is preferably formed by a material having a highly damp-proofing properties and highly water-proofing properties, and is more preferably formed by a material that further having a highly heat-resisting properties. The optical window 22 is formed by a material that transmits light emitted from the light emitting element 23-1, and transmits light reflected by a measurement target so that the reflected light is receivable by the light receiving element 24-1. The measurement target is a transparent or semitransparent liquid, such as water, flowing within a pipeline (not illustrated), for example. The light emitting element 23-1 may be formed by a light source including various LEDs (Light Emitting Diodes), such as an LD (Laser Diode) and an IR (Infra-Red) LED, for example. The lens 23-2 is provided to irradiate a light spot of the light emitted from the light emitting element 23-1 on the measurement target. The optical filter 23-3 is provided to obtain a specific wavelength or polarization, in order to reduce effects of an environment on the light. The light receiving element 24-1 may be formed by a photoelectric conversion element such as a line sensor or an image sensor including one of a PD (Photo-Diode), an APD (Avalanche Photo-Diode), a PSD (Position Sensitive Detector), and a CCD (Charged Coupled Device). The optical filter 24-3 is provided to obtain a specific wavelength or polarization, in order to reduce effects of the environment on the light. The lens 24-2 is provided to image the light reflected by the measurement target on the light receiving element 24-1. The optical filters 23-3 and 24-3 may be omitted.

In this example, a distance between the sensor module 2 (for example, the light emitting element 23-1 or an outer peripheral surface of the optical window 22) and the measurement target may be measured by a measuring method called the triangulation measuring method or the TOF measuring method. The triangulation measuring method irradiates a light spot of light emitted from the light emitting element 23-1 onto a measurement target, and performs a triangulation from an error in a position of a center of gravity of light of reflected light from the measurement target detected by the light receiving element 24-1. On the other hand, the TOF measuring method measures a propagation time of light (for example, optical pulses) that is emitted from the light emitting element 23-1, reflected by the measurement target, and received by the light receiving element 24-1. The triangulation measuring method itself, and the TOF measuring method itself, are both known, and a detailed description of each of these measuring methods will be omitted in this specification.

The control module 3 includes a light emission controller 31, an amplifier 32, a storage 33, a comparator 34, and a computing circuit 35. The light emission controller 31 is electrically connected to the light emitting element 23-1, and controls a light emission intensity, a light emission timing, or the like of the light emitting element 23-1. The amplifier 32 is electrically connected to the light receiving element 24-1, and amplifies an output signal of the light receiving element 24-1 indicating an intensity, position, or the like of the received light, to supply the amplified signal to the comparator 34. The storage 33 stores a reference value indicating the distance $V_0$ from the sensor module 2 (for example, the light emitting element 23-1 or the outer peripheral surface of the optical window 22) to the bottom surface of the pipeline. The reference value may be obtained by manually measuring the distance $V_0$ from the sensor module 2 to the bottom surface of the pipeline beforehand, or by measuring the distance $V_0$ beforehand using a measurement device (not illustrated). In addition, the reference value indicating the distance $V_0$ may be obtained based on the signal output from the light receiving element 24-1 in a case in which the light from the light emitting element 23-1 irradiates the bottom surface of the pipeline in a state where no liquid exists in the pipeline at a time of an initial setting. The comparator 34 compares a measured value that is obtained based on the signal output from the light receiving element 24-1 at a time of measuring the measurement target and indicating a distance from the sensor module 2 to a water surface within the pipeline, and the reference value stored in the storage 33, to supply a signal indicating a comparison result to the computing circuit 35. The computing circuit 35 performs a computation process on the signal indicating the comparison result, to obtain a water level from the bottom surface of the pipeline to the water surface, and outputs a signal indicating the water level.

The comparator 34 and the computing circuit 35 may form an example of a processor (or a processing means). The processor obtains the measured value indicating the distance from the sensor module 2 to the water surface within the pipeline, based on the output signal of the light receiving element 24-1, by the triangulation measuring method or the TOF measuring method. The processor compares the measured value and the reference value stored in the storage 33, and computes the water level within the pipeline by performing a computation process on the comparison result. The processor further computes the flow velocity, the flow rate, or the like of the liquid that is the measurement target within the pipeline, based on the water level, if required. A signal output from the computing circuit 35 may be supplied to an external device (not illustrated) via a cable, or may be transmitted to the external device via a communication means such as a communication device (not illustrated). The external device may be a server forming a host computer, a data center, or the like. For example, the external device may centrally manage or analyze signals from a plurality of water amount measurement devices 1. In this case, the plurality of water amount measurement devices 1 and the server may form a water amount monitoring system.

As an example, a description will be given of a case in which the water amount measurement device 1 employs the triangulation measuring method. In this case, the sensor module 2 is set at an upper part of a manhole (not illustrated), for example, and the storage 33 stores the reference value indicating the distance $V_0$ from the sensor module 2 to the bottom surface of the sewage pipeline. For example, the reference value indicating the distance $V_0$ may be obtained based on the signal output from the light receiving element 24-1 in the case in which the light from the light emitting element 23-1 irradiates the bottom surface of the sewage pipeline in the state where no liquid exists in the sewage pipeline at the time of the initial setting.

On the other hand, at the time of measuring the measurement target, the sewage pipeline is in a state where the liquid, which is an example of the measurement target, fills the sewage pipeline to a certain extent, for example. For this reason, a part of the light irradiated from the light emitting element 23-1 via the lens 23-2, the optical filter 23-3, and the optical window 22 is reflected by the liquid surface (hereinafter also referred to as a "water surface") of the liquid within the sewage pipeline. In a case in which the water surface is flat, that is, in the case in which there is no liquid flow and there are no waves at water surface, light reflection at the water surface becomes a regular reflection. In this case, the reflected light from the water surface becomes incident to the light receiving element 24-1 via the optical window 22, the optical filter 24-3, and the lens 24-2. When the reflected light satisfies a positional relationship to become incident to the light receiving element 24-1, it is possible to measure the distance from the sensor module 2 to the water surface based on the output signal of the light receiving element 24-1. In FIG. 1, the water surface within the sewage pipeline may vary from a position indicated by a solid line to a position indicated by a broken line, for example. A liquid level (hereinafter also referred to as a "water level") within the sewage pipeline can be obtained by subtracting the distance from the sensor module 2 to the water surface, from the distance $V_0$ from the sensor module 2 to the bottom surface of the sewage pipeline.

However, it is difficult to obtain an accurate water level, unless an optical axis of the light receiving element 24-1 and an optical axis of the reflected light from the water surface completely match. Because the liquid flows within the sewage pipeline, the water level changes, and waves are generated at the water surface. When such changes of the water level and the water surface occur, it is difficult to cause the reflected light from the water surface to be continuously incident to the light receiving element 24-1, however, it is possible to cause the reflected light from the water surface to be incident to the light receiving element 24-1 for an instant using a swell of the waves at the water surface. This is because, when the sensor module 2 is set at the upper part of the manhole, such as on a rear surface of a manhole cover, the light receiving element 24-1 can be set at a position that is approximately along a vertical direction with respect to the water surface.

On the other hand, a remainder part of the light irradiated from the light emitting element 23-1 via the lens 23-2, the optical filter 23-3, and the optical window 22, becomes incident to and propagates through the liquid within the sewage pipeline. A ratio of the part of the light irradiated from the sensor module 2 and reflected by the water surface within the sewage pipeline, and a ratio of the part of the light irradiated from the sensor module 2 and incident to and propagating through the liquid within the sewage pipeline, may be computed theoretically according to Fresnel equations.

In a case in which the light irradiated from the sensor module 2, from air within the manhole and having a refractive index 1, is incident at an approximately perpendicular angle to the water surface of the liquid within the sewage pipeline and having a refractive index n higher than that of the air, a reflectance r at the water surface can be represented by $r=\{(n-1)/(n+1)\}^2\%$. In a case in which the liquid is water, $n=1.33$, and thus, $r=2\%$, which means that the part of the light incident to and propagating through the liquid within the sewage pipeline is 98% of the irradiated light. In this case, the light incident to and propagating through the liquid is reflected at a liquid bottom of the liquid (hereinafter also referred to as a "water bottom"). The water bottom, that is, the bottom surface of the sewage pipeline, is generally formed by concrete. For this reason, the reflection at the water bottom is an irregular or diffuse reflection, and not a regular reflection. Hence, a part of the reflected light from the water bottom is imaged on the light receiving element 24-1. However, when the reflected light from the water bottom again passes the water surface, refraction occurs according to Snell's law because the refractive index (1.33) of water and the refractive index (1) of air differ. Consequently, a water bottom position (that is, the distance from the sensor module 2) obtained based on the signal output from the light receiving element 24-1 that receives the reflected light from the water bottom after the refraction at the water surface, is measured as a position deeper than the water bottom position (that is, farther away from the sensor module 2) obtained based on the signal output from the light receiving element 24-1 that receives the light reflected by the bottom surface of the sewage pipeline in a state where no water exists within the sewage pipeline, because an optical path length is extended by the refraction. When the light irradiated from the sensor module 2 is incident to and propagates through the water, light in a normal direction undergoes virtually no refraction at the water surface, and thus, the refraction as the light is transmitted through the water surface may be ignored.

In the case in which the water amount measurement device 1 employs the TOF measuring method, the water bottom position (that is, the distance from the sensor module 2) obtained based on the signal output from the light receiving element 24-1 that receives the reflected light from the water bottom after the refraction at the water surface, is also measured as a position deeper than the water bottom position (that is, farther away from the sensor module 2) obtained based on the signal output from the light receiving element 24-1 that receives the light reflected by the bottom surface of the sewage pipeline in the state where no water exists within the sewage pipeline, similarly as in the case in which the water amount measurement device 1 employs the triangulation measuring method. This is because the optical path length is extended by the refraction, and a light velocity in the liquid within the sewage pipeline is delayed by 1/n.

In the state where no waves exist at the water surface within the sewage pipeline, the water bottom position obtained based on the output signal of the light receiving element 24-1 indicates a position farther away from the actual water bottom position. Hence, this embodiment utilizes this phenomenon to obtain the water level. The water level obtained based on the output signal of the light receiving element 24-1 were examined for cases in which two measuring methods, namely, the triangulation measuring method and the TOF measuring methods, are used by the sensor module 2 having the light emitting element 23-1 made of an LD emitting light having a wavelength of 630 nm.

FIGS. 2A and 2B are schematic diagrams for explaining a water bottom measuring method. For the sake of convenience, FIGS. 2A and 2B illustrate only the light emitting element 23-1 and the light receiving element 24-1 of the sensor module 2. FIG. 2A is a schematic diagram for explaining a case in which the measurement is performed by floating a plate-shaped float 100 at the water surface within the sewage pipeline, and FIG. 2B is a schematic diagram for explaining a case in which the measurement is performed without floating the plate-shaped float 100 at the water surface within the sewage pipeline. A thickness of the plate-shaped float 100 may be negligibly thin. In FIGS. 2A and 2B, a solid line arrow indicates the light irradiated on the water surface (or a surface of the plate-shaped float 100) and the reflected light from the water surface in the case in which water exists within the sewage pipeline. On the other hand, in FIGS. 2A and 2B, a broken line arrow indicates the light irradiated on the bottom surface (that is, the water bottom) of the sewage pipeline and the reflected light from the bottom surface in the case in which no water exists in the sewage pipeline.

FIG. 3 is a diagram illustrating measured results of the distance from the sensor module to the water bottom measured by the measuring methods of FIGS. 2A and 2B. In FIG. 3, the ordinate indicates a distance from the sensor module 2 to the water surface or the plate-shaped float 100 within the sewage pipeline, and the abscissa indicates a water depth. The water depth indicates a distance from the water surface to the bottom surface of the sewage pipeline. In addition, symbols "x" denote plots of data measured by the triangulation measuring method using the plate-shaped float 100 illustrated in FIG. 2A, symbols "□" denote plots of data measured by the TOF measuring method using the plate-shaped float 100 illustrated in FIG. 2A, and A indicates distance data predicted from the plots of the measured data using the plate-shaped float 100. Further, symbols "▲" denote plots of data measured by the triangulation measuring method without using the plate-shaped float 100 as illustrated in FIG. 2B, symbols "◇" denote plots of data measured by the TOF measuring method without using the plate-shaped float 100 as illustrated in FIG. 2B, and B indicates distance data predicted from the plots of the measured data using no plate-shaped float 100.

From the measured results of FIG. 3, it was confirmed that, in the case in which the water exists but no waves exist at the water surface within the sewage pipeline, the water bottom obtained based on the output signal of the light receiving element 24-1 according to the configuration illustrated in FIG. 2B corresponds to a position deeper than the actual water bottom. In addition, it was confirmed that a distance sensitivity α of the sensor module 2 for the case in which the water exists within the sewage pipeline is approximately ⅓ that for the case in which no water exists within the sewage pipeline due to a difference between refractive indexes of air and water. In other words, when the distance from the sensor module 2 to the water bottom obtained based on the output signal of the light receiving element 24-1 is denoted by x, a relationship $x>V_0$ stands, and it was confirmed that the water level can be obtained by computing $(x-V_0)\times 3$.

On the other hand, it was confirmed that the reflected light can be caused to become incident to the light receiving element 24-1 by finely adjusting a set-up angle of the senor module 2. It was also confirmed that the water surface position can be obtained based on the output signal of the light receiving element 24-1 by making such a fine adjustment of the set-up angle of the sensor module 2.

Inside an actual sewage pipeline, waves are generated at the water surface in accordance with the flow of water, and the water surface (that is, a wavefront) includes small swells. As will be described later, a variation frequency of the waves (or swells) at the water surface has a strong correlation to the flow velocity of the water and the water depth.

FIG. 4 is a diagram for explaining a case in which the waves at the water surface are gentle. In FIG. 4, the ordinate indicates the distance (arbitrary units) from the sensor module 2 to the water surface obtained based on the output signal of the light receiving element 24-1, and the abscissa indicates the time (arbitrary units). In a case in which the waves generated at the water surface within the sewage pipeline are relatively small and gentle compared to the size of the light spot of the irradiated light, pulses are generated in the output signal of the light receiving element 24-1 due to the water bottom reflection, based on the position that is deeper than the bottom surface position of the sewage pipeline, and the distance data also includes a pulse component, as may be seen from FIG. 4. The case in which the waves generated at the water surface is relatively small compared to the light spot size, refers to a case in which the refraction of light at the time when the light enters the water and at the time when the light exits the water into the air is small, because sloping surfaces of the waves form approximately no angle from the vertical direction with respect to the light incident direction.

Figure 5B:
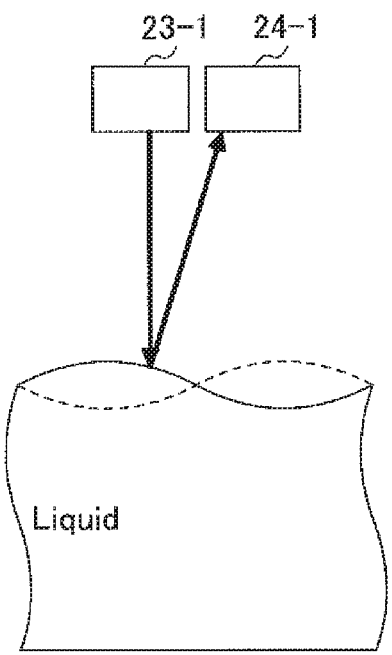

FIGS. 5A and 5B are diagrams for explaining the reflection at the water bottom and the regular reflection at the water surface in the case in which the waves at the water surface are gentle. FIG. 5A schematically illustrates an example of a water bottom reflection at a time T1 by a solid line arrow, and FIG. 5B schematically illustrates an example of a water surface regular reflection at a time T2 by a broken line arrow.

An upper envelope in FIG. 4 corresponds to an error caused by the water bottom reflection, and an average value of this upper envelope is denoted by $V_1$. Accordingly, when the distance from the sensor module 2 to the bottom surface position of the sewage pipeline in the state where the water level is 0 (that is, bottom surface position) is denoted by $V_0$, a water level $D_1$ can be represented by a difference $V_1-V_0$ in the case in which the measured value exceeds the reference value and the output signal of the light receiving element 24-1 includes signal pulses (a first signal component) generated by the water bottom reflection. According to results of experiments conducted by the present inventors, because the distance sensitivity α of the light receiving element 24-1 for the case in which the water surface reflection occurs is approximately ⅓ that for the case in which the water bottom reflection occurs, the water level D can be computed from $(V_1-V_0)\times 3$, similarly as in the case of computing the water level D when no waves exist at the water surface.

On the other hand, pulses are generated in the output signal of the light receiving element 24-1 by the water bottom reflection, in the case in which the reflected light from the water surface having the wavefront with the swells is incident to the light receiving element 24-1. Hence, in this case, the distance from the sensor module 2, obtained based on the output signal of the light receiving element 24-1, corresponds to the water surface position. In other words, a lower envelope in FIG. 4 is caused by the reflection in a vicinity of the water surface, and an average value of this lower envelope is denoted by $V_2$. Accordingly, a water level $D_2$ can be represented by a difference $V_0-V_2$ in the case in which the measured value is less than the reference value and the output signal of the light receiving element 24-1 includes signal pulses (a second signal component) generated by the water surface reflection. The water level D can be computed from $(V_0-V_2)$.

The above described computation of the water level D can be performed using the storage 33, the comparator 34, and the computing circuit 35 illustrated in FIG. 1. More particularly, the comparator 34 compares the measured value that indicates the distance from the sensor module 2 to the water surface within the sewage pipeline, and is obtained based on the output signal of the light receiving element 24-1 at the time of measuring the water level within the sewage pipeline as the measurement target, and the reference value stored in the storage 33 and indicating the distance $V_0$. Hence, the comparator 34 can judge whether the signal pulses (first signal component) generated by the water bottom reflection and included in the output signal of the light receiving element 24-1 exist in the case in which the measured value exceeds the reference value, and whether the signal pulses (second signal component) generated by the water surface reflection and included in the output signal of the light receiving element 24-1 exist in the case in which the measured value is less than the reference value. The computing circuit 35 computes the water level based on the comparison result supplied from the comparator 34, indicating whether the measured value exceeds the reference value or is less than the reference value, and whether the signal pulses (first or second signal component) generated by the water bottom reflection or the water surface reflection exist in the output signal of the light receiving element 24-1. The computing circuit 35 computes the water level $D_1$ can from the difference $V_1-V_0$ in the case in which comparison result indicates that the output signal of the light receiving element 24-1 includes the first signal component, and computes the water level $D_2$ from the difference $V_0-V_2$ in the case in which the output signal of the light receiving element 24-1 includes the second signal component.

The computing circuit 35 may count a number of signal pulses per unit time generated by the water bottom reflection and included in the output signal of the light receiving element 24-1 in the case in which the measured value exceeds the reference value, to correlate the counted number of signal pulses to a variation period of the waves (or swells) at the water surface. Because the waves (or swells) at the water surface are determined by a relationship to the flow velocity of water, the flow velocity may be obtained from a frequency of the signal pulses generated by the water bottom reflection. In other words, when an average generation period of the signal pulses (or first signal component) generated by the water bottom reflection is denoted by T, and a proportionality constant is denoted by β, a flow velocity F may be computed from $F=\beta/T$.

When the two water levels $D_1$ and $D_2$ are obtained from the average values $V_1$ and $V_2$ of the respective upper and lower envelopes of the distance data that is obtained based on the output signal of the light receiving element 24-1, the processor may determine and selectively output, as a true water level D, one of the water levels $D_1$ and $D_2$ having a more stable value. For example, the computing circuit 35 may determine the true water level D having the more stable value based on a comparison of one of amounts of change per unit time, variances, and maximum values and minimum values of the water levels $D_1$ and $D_2$.

FIG. 6 is a diagram for explaining a case in which the waves at the water surface are rough. In FIG. 6, the ordinate indicates the distance (arbitrary units) from the sensor module 2 to the water surface obtained based on the output signal of the light receiving element 24-1, and the abscissa indicates the time (arbitrary units). In a case in which the waves generated at the water surface within the sewage pipeline are relatively large and rough compared to the size of the light spot of the irradiated light, pulses are generated in the output signal of the light receiving element 24-1 due to the water bottom reflection, based on the position that is deeper than the bottom surface position of the sewage pipeline, and the distance data also includes a pulse component, as may be seen from FIG. 6. The case in which the waves generated at the water surface is relatively large compared to the light spot size, refers to a case in which the refraction of light at the time when the light enters the water and at the time when the light exits the water into the air is large, because the sloping surfaces of the waves form angles from the vertical direction with respect to the light incident direction. Particularly when the light exits the water into the air, a total reflection occurs at a critical angle of approximately 45 degrees because the light propagates from the water having the large refractive index to the air having the small refractive index, and a case may occur in which the reflected light does not return at all to the light receiving element 24-1. On the other hand, when the light enters the water, a large part of the light is reflected at the water surface according to Fresnel equations, and the reflected light returning to the light receiving element is greatly reduced.

Figure 7A:
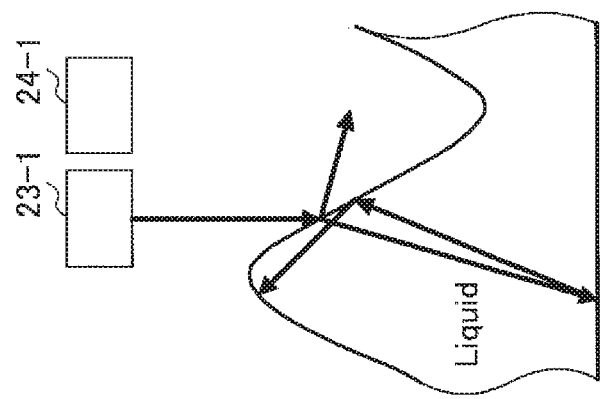
FIGS. 7A, 7B, and 7C are diagrams for explaining the reflection at the water bottom, the regular reflection at the water surface, and an interface reflection in the case in which the waves at the water surface are rough.
Figure 7B:
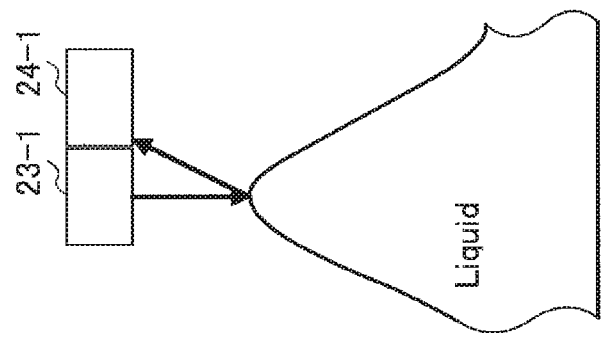
Figure 7C:
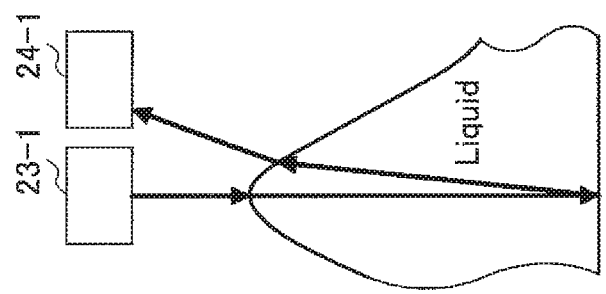

FIGS. 7A, 7B, and 7C are diagrams for explaining the reflection at the water bottom, the regular reflection at the water surface, and an interface reflection in the case in which the waves at the water surface are rough. FIG. 7A schematically illustrates an example of the water bottom reflection at a time T1 by a solid line arrow, FIG. 7B schematically illustrates an example of the water surface regular reflection at a time T2 by a solid line arrow, and FIG. 7C schematically illustrates an example of the interface reflection at a time T3 by a solid line arrow.

An upper envelope in FIG. 6 corresponds to an error caused by the water bottom reflection, and an average value of this upper envelope is denoted by $V_1$. Accordingly, when the distance from the sensor module 2 to the bottom surface position of the sewage pipeline in the state where the water level is 0 (that is, bottom surface position) is denoted by $V_0$, a water level $D_1$ can be represented by a difference $V_1-V_0$ in the case in which the output signal of the light receiving element 24-1 includes the first signal component described above. According to results of experiments conducted by the present inventors, because the distance sensitivity α of the light receiving element 24-1 for the case in which the water surface reflection occurs is approximately ⅓ that for the case in which the water bottom reflection occurs, the water level D can be computed from $(V_1-V_0) \times 3$, similarly as in the case of computing the water level D when no waves exist at the water surface.

On the other hand, pulses are generated in the output signal of the light receiving element 24-1 by the water bottom reflection, in the case in which the reflected light from the water surface having the wavefront with the swells is incident to the light receiving element 24-1. Hence, in this case, the distance from the sensor module 2, obtained based on the output signal of the light receiving element 24-1, corresponds to the water surface position. In other words, a lower envelope in FIG. 6 is caused by the reflection in a vicinity of the water surface, and an average value of this lower envelope indicated by a broken line is denoted by $V_2$. Accordingly, a water level $D_2$ can be represented by a difference $V_0-V_2$ in the case in which the output signal of the light receiving element 24-1 includes the second signal component described above. The water level D can be computed from $(V_0-V_2)$.

Hence, in the case in which the waves at the water surface are rough, the amount of light received by the light receiving element 24-1 may decrease considerably at parts where the sloping surfaces of the waves are sharp, to make the distance measurement difficult. When the amount of light received by the light receiving element 24-1 decreases considerably in this manner, the distance measurement becomes difficult at a part 200 generated at the time T3 in FIG. 6, for example, due to a considerable decrease in the output signal of the light receiving element 24-1. In addition, when the waves at the water surface are rough, a variation in the upper and lower envelopes illustrated in FIG. 6 becomes large even if the variation in the waves at the water surface is not large. However, since a center of the variation in the upper and lower envelopes depends on the true water level, the average values $V_1$ and $V_2$ of the upper and lower envelopes may be utilized for the computation of the water level.

The water level D described above may be computed using the storage 33, the comparator 34, and the computing circuit 35 illustrated in FIG. 1, similarly to the case in which the waves at the water surface are gentle. Accordingly, the computing circuit 35 may compute the water level based on the comparison result from the comparator 34, indicating whether the signal pulses generated by the water bottom reflection or the water surface reflection exist in the output signal of the light receiving element 24-1 in the case in which the measured value exceeds the reference value or is less than the reference value. The computing circuit 35 may compute the water level $D_1$ using the difference $V_1-V_0$ when the output signal of the light receiving element 24-1 includes the first signal component, and computes the water level $D_2$ using the difference $V_0-V_2$ when the output signal of the light receiving element 24-1 includes the second signal component.

In addition, the computing circuit 35 may count the number of signal pulses per unit time generated by the water bottom reflection and included in the output signal of the light receiving element 24-1 in the case in which the measured value exceeds the reference value, to correlate the counted number of signal pulses to the variation period of the waves (or swells) at the water surface, similarly to the case in which the waves at the water surface are gentle. Accordingly, when the average generation period of the signal pulses (or first signal component) generated by the water bottom reflection is denoted by T, and the proportionality constant is denoted by β, the flow velocity F may be computed from $F=\beta/T$.

As described above, the two water levels $D_1$ and $D_2$ may be obtained from the respective average values $V_1$ and $V_2$ of the upper and lower envelopes of the distance data obtained based on the output signal of the light receiving element 24-1. However, the processor described above may determine, as the true water level D, the water level having the more stable value. For example, the computing circuit 35 may determine the more stable value based on the comparison of one of the amounts of change per unit time, the variances, and the maximum values and the minimum values of the water level $D_1$ and the water level $D_2$ that are obtained, and selectively output the more stable value as the true water level D.

FIGS. 8A and 8B are diagrams illustrating results of experiments in the case in which waves are generated at the water surface. FIGS. 8A and 8B illustrate the results of the experiments for the case in which the waves at the water surface are gentle and a height of the waves is less than 1 cm. In FIGS. 8A and 8B, the ordinate indicates the output signal level (arbitrary units) of the light receiving element 24-1, and the abscissa indicates the time (arbitrary units). An initial value corresponds to the output signal level of the light receiving element 24-1 when the distance to the water bottom (bottom surface of the pipeline) is measured in the state where no water exists in the pipeline. FIG. 8A illustrates the results of the experiments for the case where the triangular measuring method is used, and FIG. 8B illustrates the results of the experiments for the case where the TOF measuring method is used.

In the case of the TOF type sensor module 2 in which the light spot diameter of the laser light irradiated from the LD forming the light emitting element 23-1 is approximately 2 mm and small compared to the size of the waves, recurrent negative pulses sometimes occur, with reference to the initial value as a stable point, in the output signal of the PD forming the light receiving element, as illustrated in FIG. 8A. However, it was confirmed that in this output signal of the PD, the lower envelope does not match the water level. It may be regarded that the mismatch is due to the reflected light from the water surface not reaching the PD because of the waves that are too large compared to the light spot diameter. Hence, in such a case, it was confirmed that the upper envelope may be used to obtain the water level. In addition, it was confirmed that the flow velocity may be computed from the measured water level, by averaging the generation period of the pulses generated by the water bottom reflection. In FIG. 8A, a part encircled by a solid-line oval indicates a location where an abnormal value is measured.

On the other hand, in the case of the triangulation type sensor module 2 in which the light spot diameter of the IR light irradiated from the IR LED forming the light emitting element 23-1 is approximately 50 mm and large compared to the size of the waves, variations were observed, in ranges of the values caused by the water surface and the waver bottom reflection, in the output signal of the PSD forming the light receiving element, as illustrated in FIG. 8B. According to specifications of the PSD used in this example, the PSD outputs a signal in which the positive-negative polarities are inverted. Hence, with respect to the initial value in FIG. 8B, the upper envelope indicates the water level caused by the water surface reflection, and the lower envelope indicates the water level caused by the water bottom reflection. In this case, although the pulses generated by the water bottom reflection are unclear in the output signal of the PSD illustrated in FIG. 8B, when the output signal of the PSD was subjected to a waveform shaping using the initial value as a threshold value, it was confirmed that the signal waveform that is obtained includes variations equivalent to the variations in the signal obtained by the TOF type sensor module 2. Instead of subjecting the output signal of the PSD to the waveform shaping, a frequency component of the output signal of the PSD may be extracted by an FFT (Fast Fourier Transform), for example. It was confirmed that, by performing such a frequency component extraction in the triangular type sensor module 2, it is possible to obtain a signal waveform similar to that obtained by the TOF type sensor module 2. In FIG. 8B, Pk indicates a peak in the signal waveform corresponding to the water surface, and Bt indicates a bottom of the signal waveform corresponding to the water bottom.

As may be seen from the results of the experiments illustrated in FIGS. 8A and 8B, the distance data is based on the output signal level of the light receiving element 24-1, and thus, the ordinate in FIGS. 4 and 6 may be regarded as the output signal level of the light receiving element 24-1. In this case, $V_0$, $V_1$, and $V_2$ respectively become values of the output signal level corresponding to the distances, and not the values of the distances.

Next, a description will be given of an example of the arrangement of the light emitting element 23-1 and the light receiving element 24-1 within the sensor module 2, and an example of the signal waveform of the light receiving element 24-1, by referring to FIGS. 9A through 11.

Figure 9A:
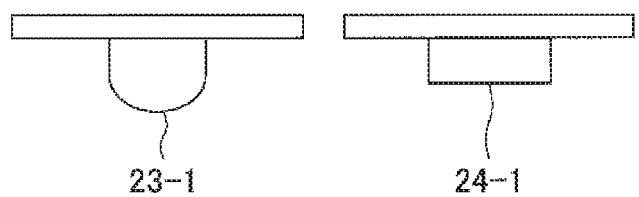
FIGS. 9A and 9B are diagrams respectively illustrating a side view and a plan view of a light emitting element and a light receiving element in a first example of an arrangement.
Figure 9B:
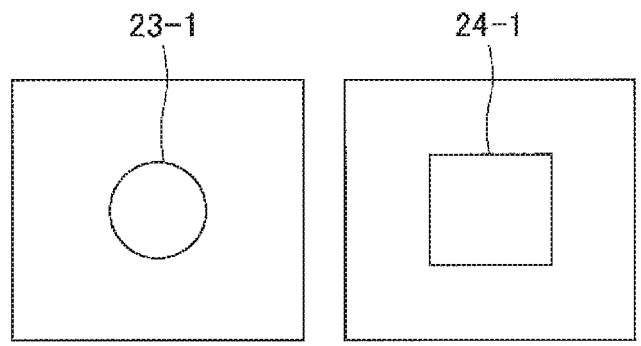

FIGS. 9A and 9B are diagrams respectively illustrating a side view and a plan view of the light emitting element and the light receiving element in a first example of the arrangement. FIG. 9A illustrates the side view of the light emitting element 23-1 and the light receiving element 24-1, and FIG. 9B illustrates the plan view of the light emitting element 23-1 and the light receiving element 24-1.

Figure 10:
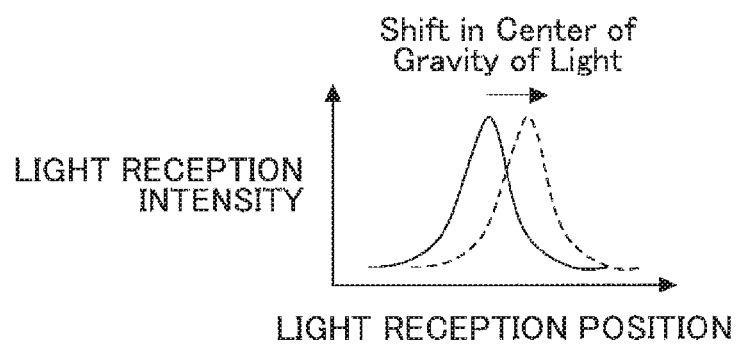
FIG. 10 is a diagram illustrating an example of a light reception intensity of the light receiving element in a case in which the sensor module employs a triangulation measuring method.

FIG. 10 is a diagram illustrating an example of a light reception intensity of the light receiving element 24-1 in a case in which the sensor module 2 illustrated in FIGS. 9A and 9B employs the triangulation measuring method. In this case, the the light receiving element 24-1 may be formed by a line sensor, such as the PSD and the CCD, and the center of gravity of light of the reflected light from the measurement target detected by the light receiving element 24-1 is converted into the signal indicating the distance from the sensor module 2. In FIG. 10, the ordinate indicates the light reception intensity of the light receiving element 24-1 in arbitrary units, and the abscissa indicates the light reception position in arbitrary units. Because the center of gravity of light received by the light receiving element 24-1 shifts from a state indicated by a solid line to a state indicated by a broken line, as illustrated by an arrow in FIG. 10, the control module 3 (for example, the computer), and thus, the processor, can convert the output signal of the light receiving element 24-1 into the signal indicating the distance from the sensor module 2.

Figure 11:
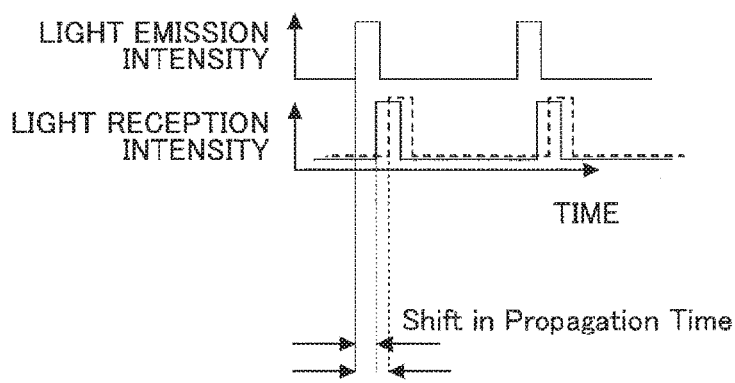
FIG. 11 is a diagram illustrating an example of a light emission intensity of the light emitting element and the light reception intensity of the light receiving element in a case in which the sensor module employs a TOF measuring method.

FIG. 11 is a diagram illustrating an example of the light emission intensity of the light emitting element 23-1 and the light reception intensity of the light receiving element 24-1 in the case in which the sensor module 2 illustrated in FIGS. 9A and 9B employs the TOF measuring method. In this case, the light receiving element 24-1 is formed by the PD, APD, or the like, and a propagation time (that is, the TOF) from the time when the light is emitted from the light emitting element 23-1 to the time when the reflected light from the measurement target reaches the light receiving element 24-1 is converted into the signal indicating the distance from the sensor module 2. In FIG. 11, the upper ordinate indicates the light emission intensity of the light emitting element 23-1 in arbitrary units, the lower ordinate indicates the light reception intensity of the light receiving element 24-1 in arbitrary units, and the abscissa indicates the time in arbitrary units. As illustrated in a lower part of FIG. 11, the propagation time from the time when the light is emitted from the light emitting element 23-1 to the time when the reflected light from the measurement target reaches the light receiving element 24-1 shifts from a state indicated by a solid line to a sate indicated by a broken line according to the change in the distance. Hence, the control module 3 (for example, the computer), and thus, the processor, can convert the output signal of the light receiving element 24-1 into the signal indicating the distance from the sensor module 2. The light receiving element 24-1 of the TOF type sensor module 2 may be formed by a line sensor, such as the PSD and the CCD, and may also be formed by a plurality of PDs, APDs, or the like.

Figure 12A:
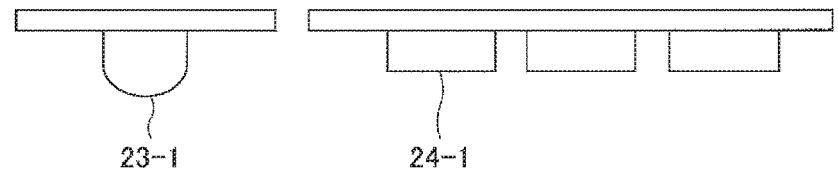
FIGS. 12A and 12B are diagrams respectively illustrating a side view and a plan view of the light emitting element and the light receiving elements in a second example of the arrangement.
Figure 12B:
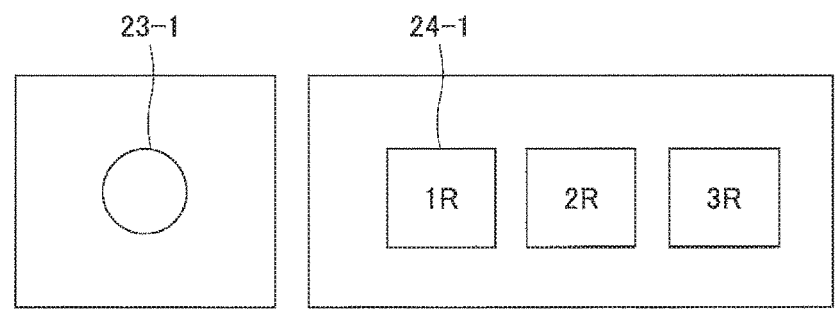

FIGS. 12A and 12B are diagrams respectively illustrating a side view and a plan view of the light emitting element and the light receiving elements in a second example of the arrangement. FIG. 12A illustrates the side view of the light emitting element 23-1 and the light receiving elements 24-1, and FIG. 12B illustrates the plan view of the light emitting element 23-1 and the light receiving elements 24-1. In this second example, the plurality of light receiving elements 24-1 are provided with respect to a single light emitting element 23-1. In the example illustrated in FIG. 12B, the 3 light receiving elements 24-1 are linearly arranged, so that the distance from the light emitting element 23-1 to each of the 3 light receiving elements 24-1 becomes farther in an ascending order indicated by 1R, 2R, and 3R. Because the plurality of light receiving elements 24-1 are linearly arranged, it is possible to positively receive the light that is emitted from the light emitting element 23-1 and reflected by the measurement target. Hence, compared to the first example described above, this second example can improve the accuracy of the distance measurement. In addition, because the reflected light from the measurement target positively reaches one of the plurality of light receiving elements 24-1, it is possible to provide a margin with respect to a mounting accuracy of the water amount measurement device 1 that is mounted on a set-up surface.

In FIGS. 12A and 12B and FIGS. 13A through 18B which will be described later, each light receiving element 24-1 may be formed by a single PD, APD, or the like, and may also be formed by a line sensor such as the PSD and the CCD. Further, each light receiving element 24-1 may be formed by a plurality of PDs, APDs, or the like. In other words, the arrangements of the light emitting element 23-1 and the light receiving element 24-1 illustrated in FIGS. 12A through 18B may be used in the triangular type sensor module 2 or the TOF type sensor module 2. Moreover, when the plurality of light receiving elements 24-1 are provided with respect to the single light emitting element 23-1, the control module 3 may perform the computation process described above, separately with respect to the output signal of each of the plurality of light receiving elements 24-1, or with respect to a signal that is obtained by adding or synthesizing the output signals of the plurality of light receiving elements 24-1, or with respect to a signal that is obtained by averaging the output signals of the plurality of light receiving elements 24-1. Alternatively, the control module 3 may perform the computation process described above with respect to a signal that is obtained by performing a process, other than adding, synthesizing, and averaging, on the output signals of the plurality of light receiving elements 24-1.

Figure 13A:
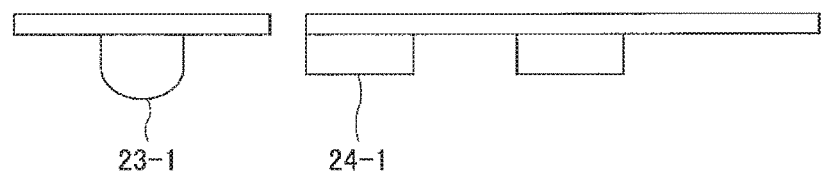
FIGS. 13A and 13B are diagrams respectively illustrating a side view and a plan view of the light emitting element and the light receiving elements in a third example of the arrangement.
Figure 13B:
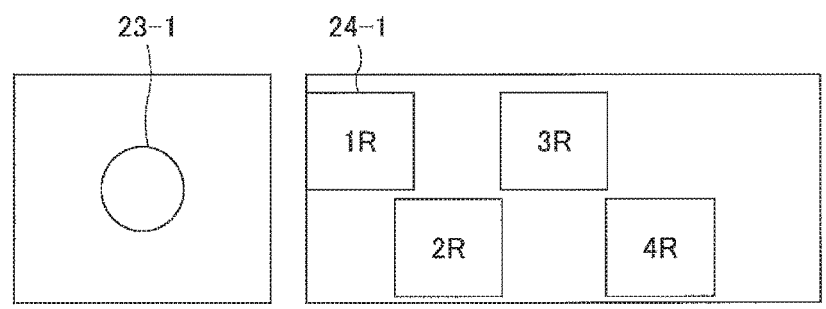

FIGS. 13A and 13B are diagrams respectively illustrating a side view and a plan view of the light emitting element and the light receiving elements in a third example of the arrangement. FIG. 13A illustrates the side view of the light emitting element 23-1 and the light receiving elements 24-1, and FIG. 13B illustrates the plan view of the light emitting element 23-1 and the light receiving elements 24-1. In this third example, 4 light receiving elements 24-1 are arranged in two rows, with respect to the single light emitting element 23-1, so that the distance from the light emitting element 23-1 to each of the 4 light receiving elements 24-1 becomes farther in an ascending order indicated by 1R, 2R, 3R, and 4R. Because the plurality of light receiving elements 24-1 are provided in the two rows, it is possible to more positively receive the light that is emitted from the light emitting element 23-1 and reflected by the measurement target. Hence, compared to the first example described above, this third example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

Figure 14A:
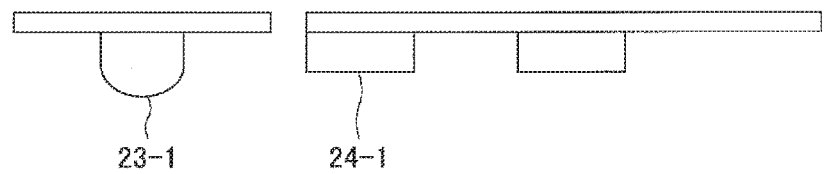
FIGS. 14A and 14B are diagrams respectively illustrating a side view and a plan view of the light emitting element and the light receiving elements in a fourth example of the arrangement.
Figure 14B:
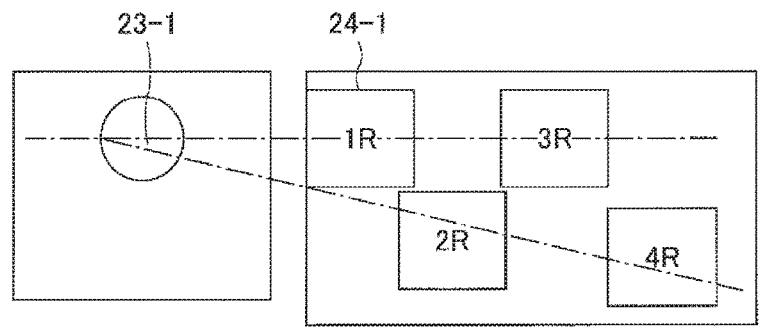

FIGS. 14A and 14B are diagrams respectively illustrating a side view and a plan view of the light emitting element and the light receiving elements in a fourth example of the arrangement. FIG. 14A illustrates the side view of the light emitting element 23-1 and the light receiving elements 24-1, and FIG. 14B illustrates the plan view of the light emitting element 23-1 and the light receiving elements 24-1. In this fourth example, 4 light receiving elements 24-1 are arranged concentrically with respect to the single light emitting element 23-1, as indicated by a one-dot chain line, so that the distance from the light emitting element 23-1 to each of the 4 light receiving elements 24-1 becomes farther in an ascending order indicated by 1R, 2R, 3R, and 4R. Because the plurality of light receiving elements 24-1 are provided concentrically, it is possible to more positively receive the light that is emitted from the light emitting element 23-1 and reflected by the measurement target. Hence, compared to the first example described above, this fourth example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

FIGS. 15A and 15B are diagrams respectively illustrating a side view and a plan view of the light emitting element and the light receiving elements in a fifth example of the arrangement. FIG. 15A illustrates the side view of the light emitting element 23-1 and the light receiving elements 24-1, and FIG. 15B illustrates the plan view of the light emitting element 23-1 and the light receiving elements 24-1. In this fifth example, 3 light receiving elements 24-1 are linearly arranged on one side (left side) of the single light emitting element 23-1, so that the distance from the light emitting element 23-1 to each of the 3 light receiving elements 24-1 becomes farther in an ascending order indicated by 1L, 2L, and 3L. Further, 3 light receiving elements 24-1 are linearly arranged on the other side (right side) of the single light emitting element 23-1, so that the distance from the light emitting element 23-1 to each of the 3 light receiving elements 24-1 becomes farther in an ascending order indicated by 1R, 2R, and 3R. The distances from the light emitting element 23-1 to the 3 light receiving elements 24-1 located on the left side at the positions indicated by 1L, 2L, and 3L are respectively equal to the distances from the light emitting element 23-1 to the 3 light receiving elements 24-1 located on the right side at the positions indicated by 1R, 2R, and 3R. In other words, the 3 light receiving elements 24-1 on the left side and the 3 light receiving elements 24-1 on the right side are arranged in line symmetry to the light emitting element 23-1. Because the plurality of light receiving elements 24-1 are provided in one row on each of the two sides of the light emitting element 23-1, it is possible to more positively receive the light that is emitted from the light emitting element 23-1 and reflected by the measurement target. Hence, compared to the second through fourth examples described above, this fifth example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

FIGS. 16A and 16B are diagrams respectively illustrating a side view and a plan view of the light emitting element and the light receiving elements in a sixth example of the arrangement. FIG. 16A illustrates the side view of the light emitting element 23-1 and the light receiving elements 24-1, and FIG. 16B illustrates the plan view of the light emitting element 23-1 and the light receiving elements 24-1. In this sixth example, 2 light receiving elements 24-1 are linearly arranged on one side (left side) of the single light emitting element 23-1, and 2 light receiving elements 24-1 are linearly arranged on the other side (right side) of the single light emitting element 23-1, so that the distance from the light emitting element 23-1 to each of the 4 light receiving elements 24-1 on the left and right side becomes farther in an ascending order indicated by 1R, 2L, 3R, and 4L. Because the plurality of light receiving elements 24-1 are provided in one row on each of the two sides of the light emitting element 23-1, it is possible to more positively receive the light that is emitted from the light emitting element 23-1 and reflected by the measurement target. Hence, compared to the second through fourth examples described above, this sixth example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

Figure 17A:
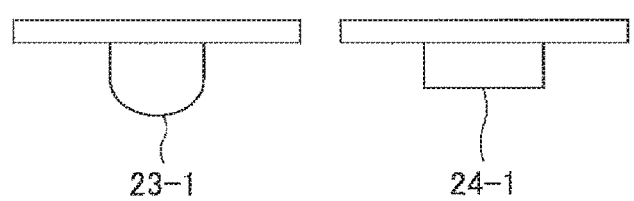
FIGS. 17A and 17B are diagrams respectively illustrating a side view and a plan view of the light emitting element and the light receiving elements in a seventh example of the arrangement.
Figure 17B:
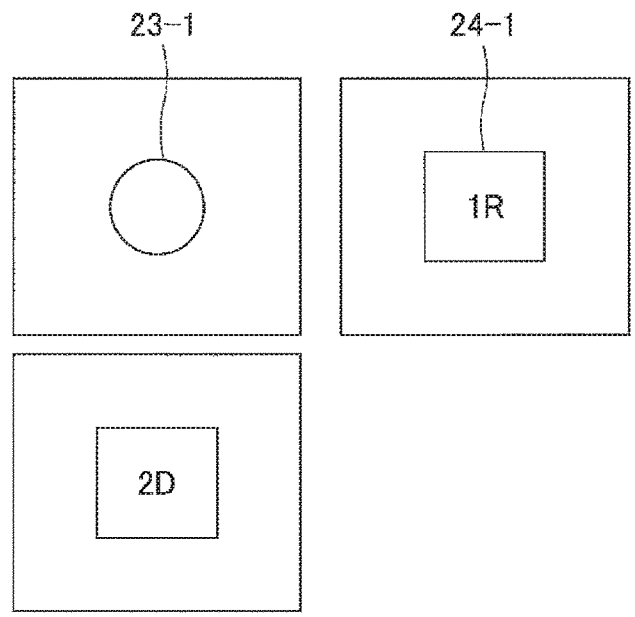

FIGS. 17A and 17B are diagrams respectively illustrating a side view and a plan view of the light emitting element and the light receiving elements in a seventh example of the arrangement. In this seventh example, 1 light receiving elements 24-1 is arranged on one side (right side) of the single light emitting element 23-1, and 1 light receiving elements 24-1 is arranged on another side (front side) of the single light emitting element 23-1. The distance from the light emitting element 23-1 to the light receiving element 24-1 located on the right side at a position indicated by 1R is equal to the distance from the light emitting element 23-1 to the light receiving elements 24-1 located on the front side at a position indicated by 1D. In other words, the light receiving element 24-1 on the right side and the light receiving element 24-1 on the front side are arranged along perpendicular directions with respect to the light emitting element 23-1. Because the plurality of light receiving elements 24-1 are provided in different sides of the light emitting element 23-1, it is possible to more positively receive the light that is emitted from the light emitting element 23-1 and reflected by the measurement target. Hence, compared to the first example described above, this seventh example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

Of course, in FIG. 17B, at each of the right side and the front side of the light emitting element 23-1, a plurality of light receiving elements 24-1 may be linearly arranged in one row as in any of the second, fifth, and sixth examples described above, or may be linearly arranged in two rows as in the third example or the fourth example.

FIGS. 18A and 18B are diagrams respectively illustrating a side view and a plan view of the light emitting element and the light receiving elements in an eighth example of the arrangement. FIG. 18A illustrates the side view of the light emitting element 23-1 and the light receiving elements 24-1, and FIG. 18B illustrates the plan view of the light emitting element 23-1 and the light receiving elements 24-1. In this eighth example, 1 light receiving element 24-1 is arranged on each of the left side of the single light emitting element 23-1 at a position 1L, the right side of the single light emitting element 23-1 at a position 1R, a rear side of the single light emitting element 23-1 at a position 2U, and the front side of the single light emitting element 23-1 at a position 2D. The distances from the light emitting element 23-1 to each of the 4 light receiving elements 24-1 on the left, right, rear, and front sides are equal. In other words, the 4 light receiving elements 24-1 are arranged to surround the light emitting element 23-1. Because the plurality of light receiving elements 24-1 are provided to surround the light emitting element 23-1, it is possible to more positively receive the light that is emitted from the light emitting element 23-1 and reflected by the measurement target. Hence, compared to the first through seventh examples described above, this eighth example can further improve the accuracy of the distance measurement. In addition, because the reflected light from the measurement target positively reaches one of the plurality of light receiving elements 24-1, it is possible to provide a margin with respect to the mounting accuracy of the water amount measurement device 1 that is mounted on the set-up surface.

In the example illustrated in FIG. 18B, the light receiving elements 24-1 located at the positions 1L and 1R are linearly arranged in one row, and the light receiving elements 24-1 located at the positions 2U and 2D are linearly arranged in one row. In addition, a direction in which the light receiving elements 24-1 located at the positions 1L and 1R are linearly arranged in one row, and a direction in which the light receiving elements 24-1 located at the positions 2U and 2D are linearly arranged in one row, are perpendicular to each other.

Of course, in FIG. 18B, at each of the right side, the left side, the rear side, and the front side of the light emitting element 23-1, a plurality of light receiving elements 24-1 may be linearly arranged in one row as in any of the second, fifth, and sixth examples described above, or may be linearly arranged in two rows as in the third example or the fourth example. Further, in FIG. 18B, a plurality of light receiving elements 24-1 that are provided in one row and concentrically to the light emitting element 23-1, may be arranged along a plurality of radial directions passing through a center of the light emitting element 23-1, so as to surround the light emitting element 23-1.

FIG. 19 is a block diagram illustrating another example of the control module 3. The control illustrated in FIG. 19 includes a CPU (Central Processing Unit) 301 that is an example of a processor, a memory 302 that is an example of a storage, and an output device 304. The memory 302 may store one or more programs executed by the CPU 301, and various data including data such as the reference value, the data of the measured water level or the like, and logs of the measurements. The CPU 301 executes the program stored in the memory 302, to perform a function similar to that of the light emission controller 31 illustrated in FIG. 1, and output control signals for controlling the light emission intensity, the light emission timing, or the like of the light emitting element 23-1 within the sensor module 2. In addition, the CPU 301 executes the program stored in the memory 302, to perform functions similar to those of the amplifier 32, the comparator 23, and the computing circuit 35 illustrated in FIG. 1, and compute the water level or the like within the pipeline. More particularly, the CPU 301 obtains the measured value indicating the distance from the sensor module 2 to the water surface within the pipeline, using the triangulation measuring method or the TOF measuring method, based on the output signal of the light receiving element 24-1, and compares the measured value and the reference value stored in the memory 302. Further, the CPU 301 performs a computation process on the comparison result, to compute the water level within the pipeline. The CPU 301 may further compute the flow velocity, the flow rate, or the like of the liquid, which is the measurement target within the pipeline, from the water level, if required. In other words, the CPU 301 may perform functions similar to those of the computer (or control means) or the processor (or processing means) described above. For example, the flow rate may be computed by multiplying a coefficient to an inverse number of a variation period of the output signal of the light receiving element 24-1.

The output device 303 outputs measurement information, such as the distance, the water level, the flow velocity, and the flow rate, output from the CPU 301. The output device 303 may supply the measurement information to a notification destination, such as a server of the water amount monitoring system, if required. The output device 303 may be formed by an interface for connecting a cable used to notify the measurement information output from the control module 3 to the notification destination by cable communication, or a communication means such as a communication device for notifying the measurement information output from the control module 3 to the notification destination by wireless communication. The communication means may be formed by a transmitter receiver (or transceiver), however, in a case in which the water amount measurement device 1 merely has the function to transmit the measurement information and does not include the function to receive information from the server, the communication means may be formed by a transmitter. The water level, the flow velocity, the flow rate or the like of the measurement target may be computed at the server that is notified of the measurement information (the signal indicating the distance), in order to reduce a computation load on the control module 3.

Figure 20:
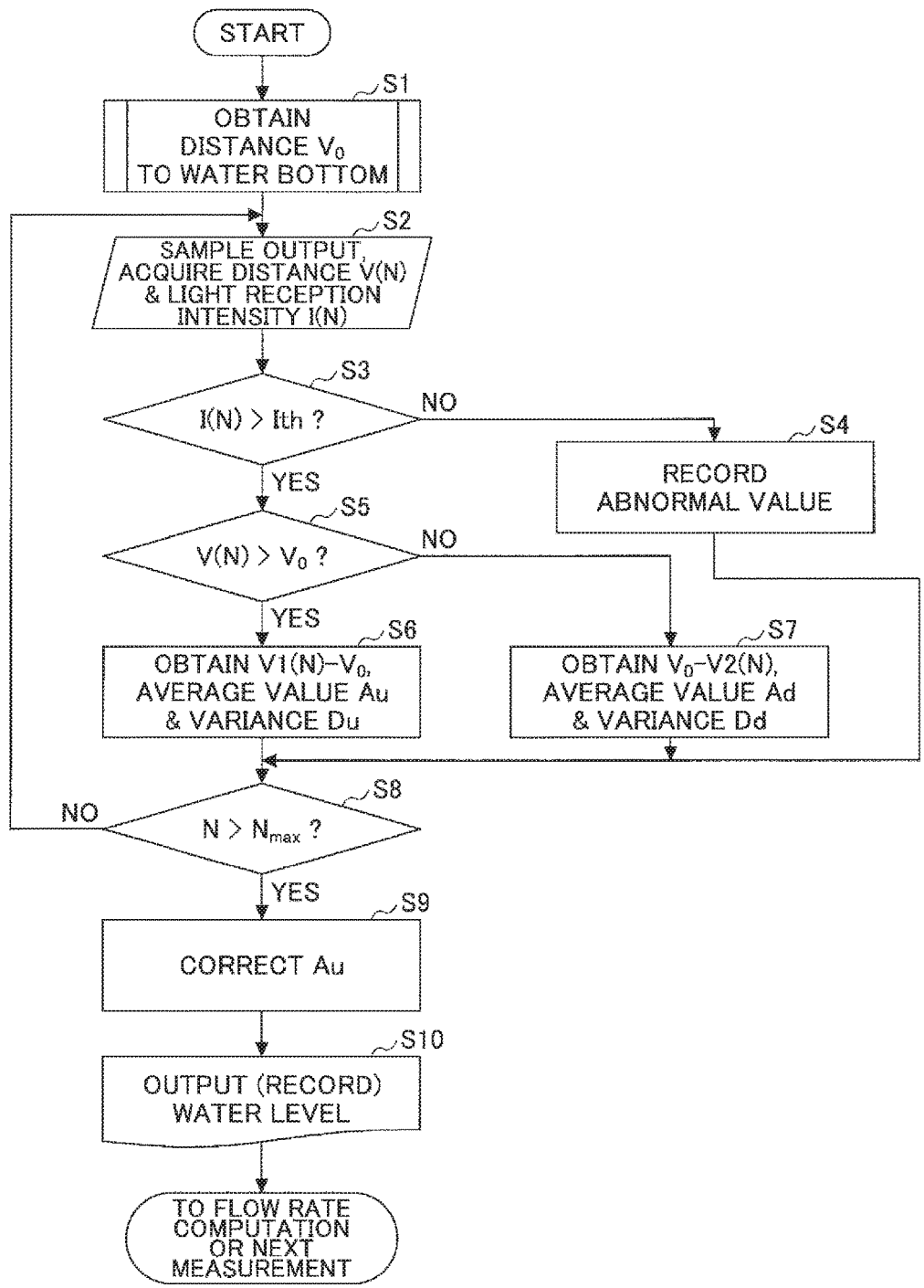
FIG. 20 is a flow chart for explaining an example of a water level measuring process.

FIG. 20 is a flow chart for explaining an example of a water level measuring process. The water level measuring process illustrated in FIG. 20 may be performed by the comparator 34 and the computing circuit 35 of the control module 3 illustrated in FIG. 1, or by the CPU 301 of the control module 3 illustrated in FIG. 19. However, for the sake of convenience, a description will hereinafter be given of an example in which the CPU 301 performs the water level measuring process.

In FIG. 20, the CPU 301, in step S1, obtains the distance $V_0$ to the water bottom within the sewage pipeline, which is an example of the measurement target, based on the output signal of the light receiving element 24-1 in a state where no water exists in the sewage pipeline at the time of the initial setting. In step S1, the CPU 301 may manually measure the distance V0 from the sensor module 2 to the bottom surface of the sewage pipeline beforehand, or read from the memory 302 the distance $V_0$ measured beforehand by the measurement device.

Next, the CPU 301, in step S2, outputs the control signals to control the light emission intensity, the light emission timing, or the like of the light emitting element 23-1, to cause light emission from the light emitting element 23-1, and samples the output signal of the light receiving element 24-1 that receives the reflected light from the measurement target, to acquire a distance V(N) and a light reception intensity I(N) based on an Nth sample. The CPU 301, in step S3, judges whether the light reception intensity I(N) satisfies $I(N)>I_{th}$, that is, whether the light reception intensity I(N) of the Nth sample is a sufficiently high value exceeding a threshold value $I_{th}$ of the light reception intensity. When the light reception intensity I(N) has a value exceeding the threshold value $I_{th}$ of the light reception intensity, it is judge that the Nth sample is a normal value usable for the measuring process. When the judgment result in step S3 is NO, the CPU 301 records an abnormal value of the light reception intensity I(N) in the memory 302, and the process advances to step S8 which will be described later.

On the other hand, when the judgment result in step S3 is YES, the CPU 301, in step S5, judges whether the distance V(N) satisfies $V(N)>V_0$, that is, whether the distance V(N) exceeds the distance $V_0$ to the water bottom. When the judgment result in step S5 is YES, the CPU 301, in step S6, obtains the water level $D_1$ from a difference $V_1(N)-V_0$ in a case in which the first signal component is included in the output signal of the light receiving element 24-1, using an average value $V_1(N)$ of the upper envelope of the distance data obtained based on the output signal of the light receiving element 24-1, and obtains an average value Au of the water level $D_1$ and a variance Du per unit time of the water level $D_1$. In addition, when the judgment result in step S5 is NO, the CPU 301, in step S7, obtains the water level $D_2$ from a difference $V_0-V_2(N)$ in a case in which the second signal component is included in the output signal of the light receiving element 24-1, using an average value $V_2(N)$ of the lower envelope of the distance data obtained based on the output signal of the light receiving element 24-1, and obtains an average value Ad of the water level $D_2$ and a variance Dd per unit time of the water level $D_2$. After step S6 or step S7, the process advances to step S8.

The CPU 301, in step S8, judges whether a relationship $N>N_{max}$ is repeatedly satisfied for a predetermined time period, where $N_{max}$ denotes an upper limit of the number of samples within the predetermined time period. The process returns to step S2 when the judgment result in step S8 is NO. When the judgment result in step S8 is YES, the CPU 301, in step S9, multiplies a correction value c1 to the average value Au of the water level $D_1$, that is, corrects the average value Au by computing {Au×c1}. In addition, the CPU 301, in step S10, determines, as a true water level indicating a more stable value, a water level D computed from {Au×c1} that is obtained by correcting the average value Au by a correction value c1 when Du<=Dd, and a water level D computed from {Ad} or [{(Au×c1)+Ad)}/2] when Du>Dd, to selectively output the true water level indicating the more stable value. In step S10, the CPU 301 may record the output water level D if required. After step S10, the process of the CPU 301 may advance to the next water level measuring process, or to a flow rate measuring process which will be described later in conjunction with FIG. 21. The water level D output from the CPU 301 may be notified to the server in real-time, or may be notified to the server only when a high water level exceeding the threshold value is output.

Figure 21:
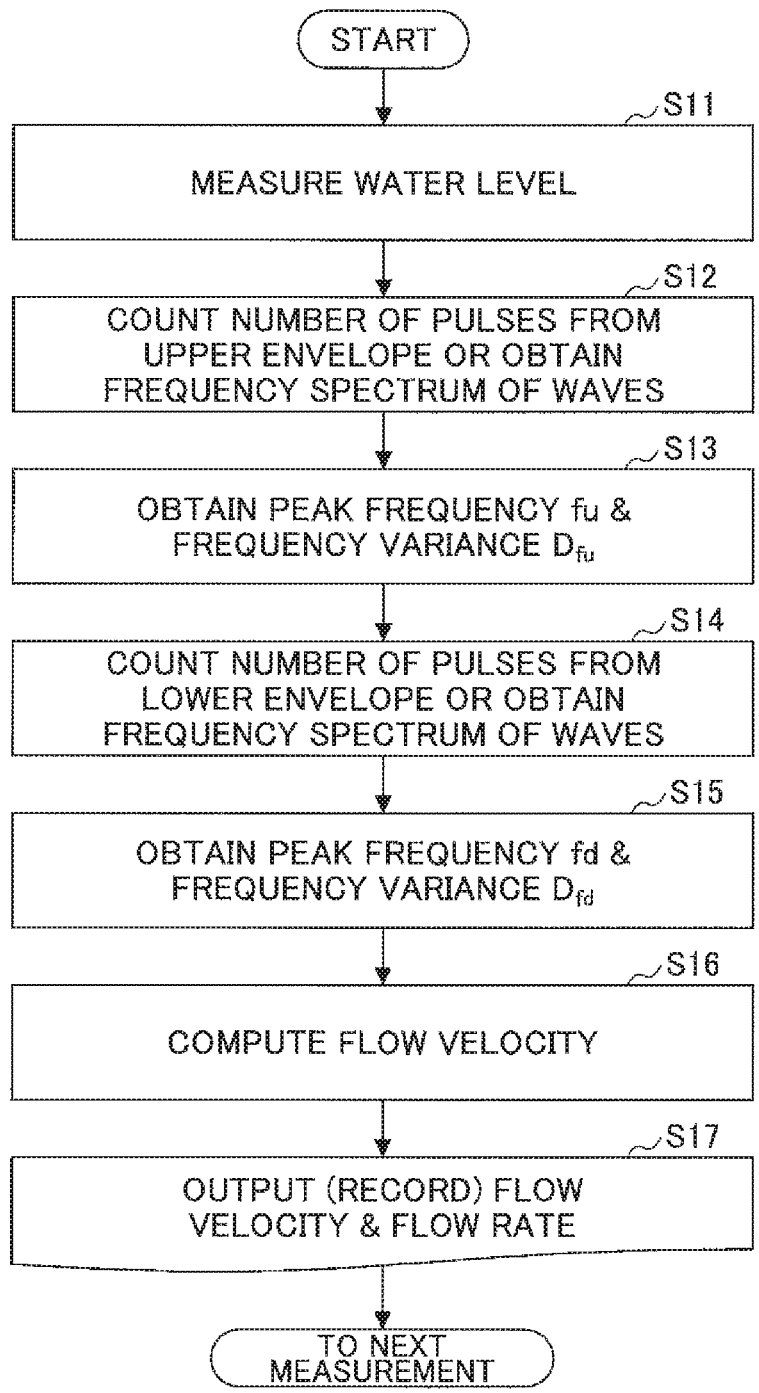
FIG. 21 is a flow chart for explaining an example of a flow rate measuring process.

FIG. 21 is a flow chart for explaining an example of the flow rate measuring process. The flow rate measuring process illustrated in FIG. 21 may be performed by the comparator 34 and the computing circuit 35 of the control module 3 illustrated in FIG. 1, or by the CPU 301 of the control module 3 illustrated in FIG. 19. However, for the sake of convenience, a description will hereinafter be given of an example in which the CPU 301 performs the flow rate measuring process.

In FIG. 21, the CPU 301, in step S11, obtains the water level within the sewage pipeline, which is an example of the measurement target, by performing the water level measuring process illustrated in FIG. 20, for example. In this state, the water level $D_1$ obtained in the case in which the first signal component is included in the output signal of the light receiving element 24-1, using the average value $V_1(N)$ of the upper envelope of the distance data obtained based on the output signal of the light receiving element 24-1, and the water level $D_2$ obtained in the case in which the second signal component is included in the output signal of the light receiving element 24-1, using the average value $V_2(N)$ of the lower envelope of the distance data obtained based on the output signal of the light receiving element 24-1, are distinguishable from each other. The CPU 301, in step S12, counts the number of signal pulses per unit time, corresponding to a distance exceeding the distance $V_0$, and generated by the water bottom reflection and included in the output signal of the light receiving element 24-1, using the average value $V_1(N)$ of the upper envelope, to obtain a variation period of the waves (or swells) at the water surface from the counted number of signal pulses, or to obtain a frequency spectrum of the waves by FFT, wavelet, filter sweep, or the like. Next, the CPU 301, in step S13, obtains a peak frequency fu of the waves and a frequency variance $D_{fu}$ with respect to a center frequency, based on the variation period of the waves or the frequency spectrum of the waves. In addition, the CPU 301, in step S14, counts the number of signal pulses per unit time, corresponding to a distance less than the distance $V_0$, and generated by the water surface reflection and included in the output signal of the light receiving element 24-1, using the average value $V_2(N)$ of the lower envelope, to obtain a variation period of the waves (or swells) at the water surface from the counted number of signal pulses, or to obtain a frequency spectrum of the waves by FFT, wavelet, filter sweep, or the like. Next, the CPU 301, in step S15, obtains a peak frequency fd of the waves and a frequency variance $D_{fd}$ with respect to a center frequency, based on the variation period of the waves or the frequency spectrum of the waves. Then, the CPU 301, in step S16, computes a flow velocity F2 from {fu×c2} by multiplying a correction value c2 to the peak frequency fu when $D_{fu}<=D_{fd}$, and computes a flow velocity F1 from {fd×c2} or {c2×(fu+fd)/2} when $D_{fu}>D_{fd}$. In step S16, the CPU 301 may compute the flow rate within the sewage pipeline, based on the computed flow velocity and a width of the sewage pipeline that is measured beforehand. The CPU 301, in step S17, outputs the flow velocity, the flow rate, or the like that are computed, and records the flow velocity, the flow rate, or the like in the memory, if required. After step S17, the process of the CPU 301 advances to a next water amount measuring process. The flow velocity, the flow rate, or the like that are output from the CPU 301 may be notified to the server in real-time, or may be notified to the server only when the flow velocity, the flow rate, or the like that are output exceed threshold values.

Next, a description will be given of an example of the water amount monitoring system to which the water amount measurement device of each of the embodiments described above may be applied, by referring to FIGS. 22 through 24.

Figure 22:
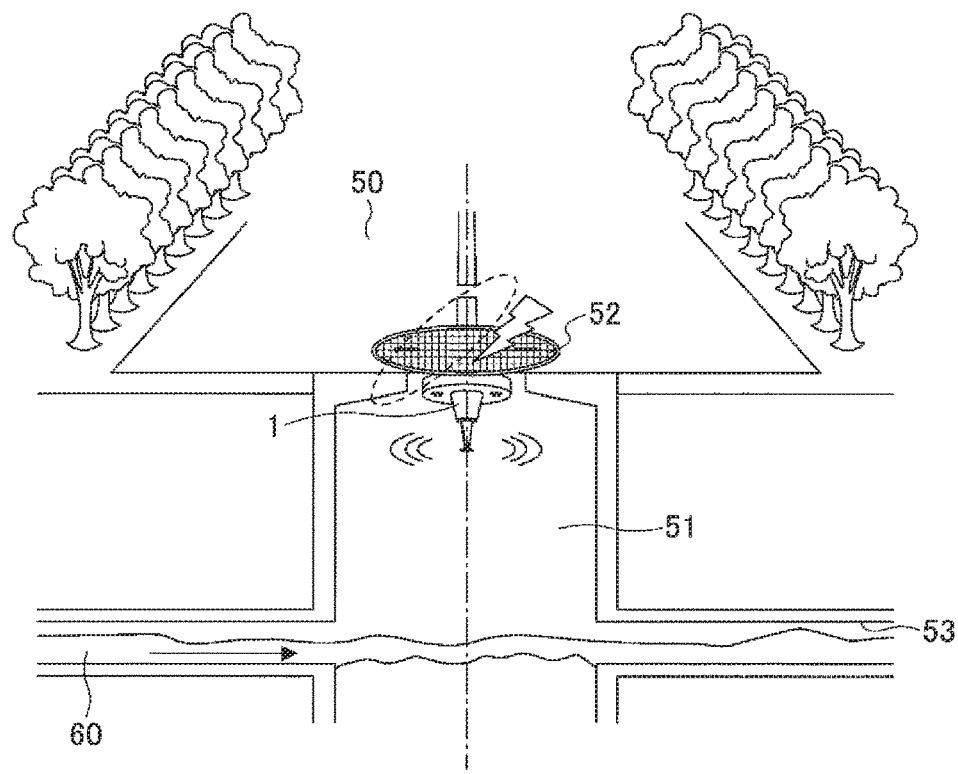
FIG. 22 is a diagram for explaining an example of a manhole in which the water amount measurement device is set.
Figure 23:
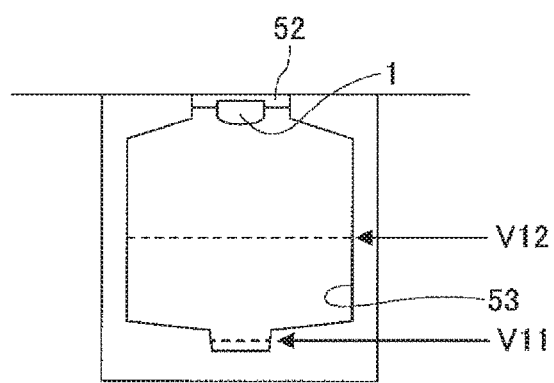
FIG. 23 is a cross sectional view illustrating an example of a sewage pipeline.
Figure 24:
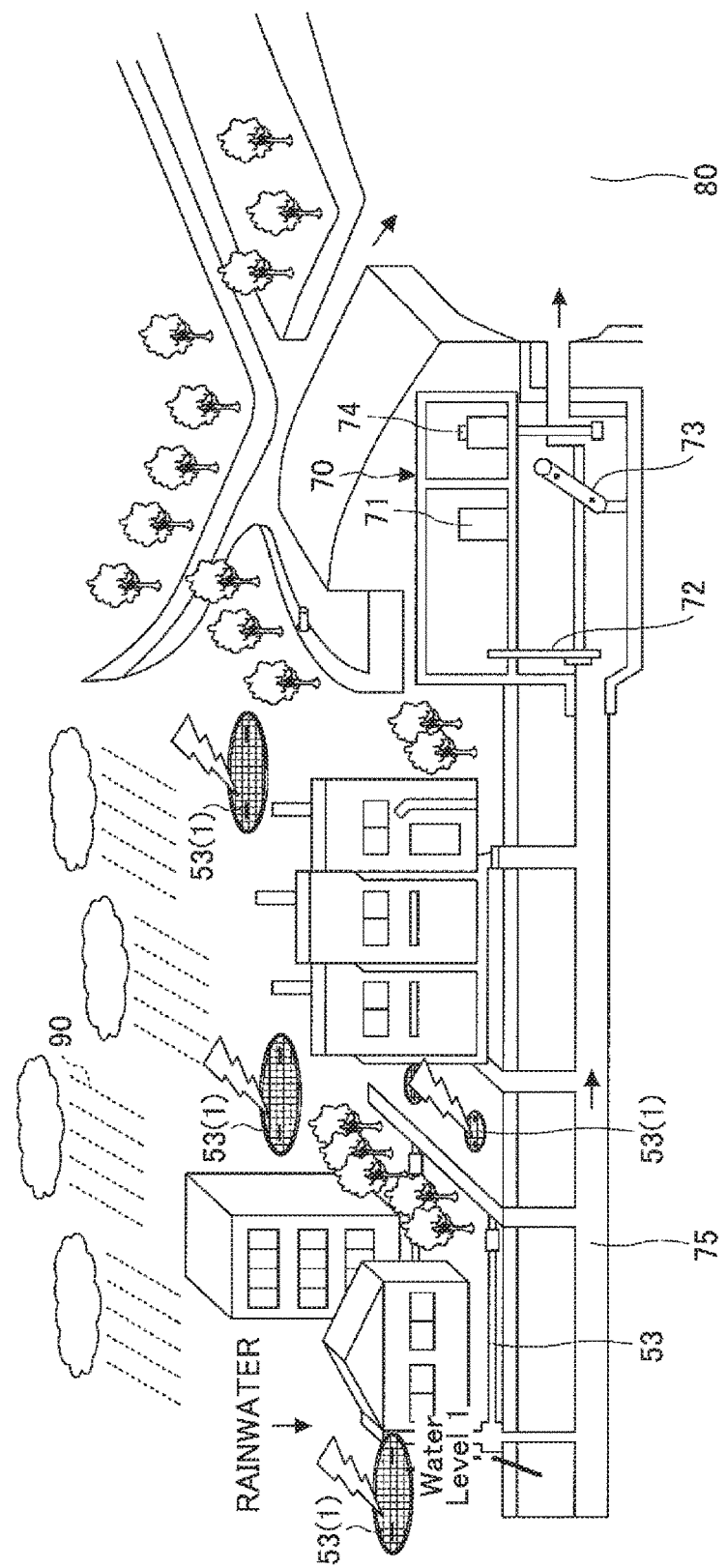
FIG. 24 is a diagram for explaining an example of a water amount monitoring system.

FIG. 22 is a diagram for explaining an example of the manhole in which the water amount measurement device is set. FIG. 23 is a cross sectional view illustrating an example of the sewage pipeline. FIG. 24 is a diagram for explaining an example of the water amount monitoring system.

In the example illustrated in FIG. 22, a manhole 51 is provided in a road 50, and the manhole 51 is covered by a manhole cover 52 that can be opened and closed. The manhole 51 communicates to a sewage pipeline 53 that runs under the road 50. Liquid 60, such as water, flows through the sewage pipeline 53 from left to right in FIG. 22, for example, as indicated by an arrow. The water amount measurement device 1 is set on a rear surface (that is, on a side opposite from a road surface of the road 50) of the manhole cover 52, for example. Of course, only the sensor module 2 of the water amount measurement device 1 may be set on the rear surface of the manhole cover 52. In this case, the control module 3 may be set on a sidewall of the manhole 51 or the like, and may be connected to the sensor module 2 via a cable.

FIG. 23 illustrates a cross section of the manhole 51 illustrated in FIG. 22 along a one-dot chain line. In FIG. 23, $V_{11}$ denotes a low water level of the sewage pipeline 53, and $V_{12}$ denotes a high water level of the sewage pipeline 53. As described above, the water amount measurement device 1 can accurately measure the water level or the like within the sewage pipeline 53. Hence, when the high water level V12 is measured, for example, the server can take measures to lower the water level within the sewage pipeline 53 to a tolerable water level, based on the notification from the water amount measurement device 1.

In the water amount monitoring system illustrated in FIG. 24, a data center 70 includes a server 71, a gate 72, a water purifying plant 73, a pump 74, or the like. The server 71 may be formed by a known general-purpose computer, and has a configuration similar to that illustrated in FIG. 19, including a CPU, a memory, and a communication device. The communication device of the server 71 is communicable with the communication device of a plurality of water amount measurement devices 1. The communication device of the plurality of water amount measurement devices 1 preferably notifies the measurement information, such as the water level, to the server 71. In this example, the sewage pipeline 53, that is monitored by the water amount measurement device 1 set on the rear surface of the manhole cover 52 of each manhole 51, is connected to a rainwater drain pipe 75. The liquid flowing through the rainwater drain pipe 75 is supplied to the water purifying plant 73, via the gate 72 that is controlled to open and close by the server 71. The water purifying plant 73 purifies the liquid supplied thereto, and the pump 73 discharges the purified liquid to sea 80 or the like. For example, when an amount of precipitation caused by rain 90 is large, a purifying amount of the water purifying plant 73 and a discharging amount of the pump 74 need to be increased to avoid an overflow of the liquid flowing through the rainwater drain pipe 75 and the sewage pipeline 53. For example, 53(1) denotes the sewage pipeline 53 having a water level 1.

In this example, the server 71 aggregates the measurement data notified from the plurality of water amount measurement devices 1 forming water amount sensor nodes. The aggregating of the measurement data at the server 71 includes operations such as logging and processing the measurement data, displaying a summary of the measurement results or displaying a warning, and reporting to a server of an upstream side data center. Accordingly, the server 71 can appropriately control the open and closed states of the gate 72, the purifying amount of the water purifying plant 73, and the discharging amount of the pump 74, based on the measurement data notified from each of the plurality of water amount measurement devices 1, to avoid the overflow of the liquid flowing through the rainwater drain pipe 75 and the sewage pipeline 53. The water amount measurement device 1 itself is small, inexpensive, and has a low power consumption, thereby easily enabling construction of the water amount monitoring system by a multi-point measurement network. In addition, by combined usage of the water amount measurement device 1 with a conventional pressure type sensor, an ultrasonic type sensor, or the like, it is possible to construct a multi-point measurement network according to requirements of a set-up environment and accuracy.

According to each of the embodiments described above, it is possible to make a non-contact measurement of a distance from the sensor module to the measurement target, by utilizing both the light reflected by the water surface, and the light transmitted through the water and reflected by the water bottom, which are received by the light receiving element. For this reason, it is possible to accurately make a non-contact measurement of the water amount, such as the water level. In addition, the size of the sensor module can be made small, and the sensor module can measure the distance to the measurement target without the use of the plate-shaped float. Hence, the sensor module may be set within a small or narrow space, such as at the upper part of the manhole, and the restrictions on the usage of the sensor module can be suppressed. Furthermore, the water amount measurement device including the sensor module is inexpensive, and can perform the measurement with a low power consumption. Moreover, because the flow velocity can be measured by utilizing the variation in the signal output by the light receiving element which receives the light, the water amount measurement device can also simultaneously measure the water amount, such as the water level, the flow velocity, the flow rate, or the like.

Although the examples are numbered with, for example, "first," "second," "third," . . . , the ordinal numbers do not imply priorities of the examples. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A water amount measurement device configured to measure a water level of a liquid flowing within a pipeline, comprising:
a light emitting element configured to irradiate light on a liquid surface of the liquid;
a light receiving element configured to receive light reflected by the liquid surface and light reflected by a liquid bottom of the liquid at a bottom surface within the pipeline;
a storage configured to store a distance $V_0$ from the light emitting element to the liquid bottom within the pipeline; and
a processor configured to compute a water level $D_1$ using $V_1-V_0$, where $V_1$ denotes a distance represented by an average value of an upper envelope of distance data obtained based on an output signal of the light receiving element, when a comparison result of the distance data and the distance $V_0$ at a time of measuring the water level includes a first signal component corresponding to a distance exceeding the distance $V_0$ generated by the reflection from the liquid bottom within the pipeline, and compute a water level $D_2$ using $V_0-V_2$, where $V_2$ denotes a distance represented by an average value of a lower envelope of the distance data, when the comparison result includes a second signal component corresponding to a distance less than the distance $V_0$ generated by the reflection from the liquid surface,
wherein a distance sensitivity of the light receiving element for a case in which the reflection from the liquid surface occurs is approximately ⅓ that for a case in which the reflection from the liquid bottom occurs, and the processor computes the water level $D_1$ based on $(V_1-V_0) \times 3$, and computes the water level $D_2$ based on $(V_0-V_2)$.

2. The water amount measurement device as claimed in claim 1, wherein the processor selectively outputs, as a true water level D, one of the water level $D_1$ and the water level $D_2$ having a more stable value.

3. The water amount measurement device as claimed in claim 2, wherein the processor determines the more stable value based on a comparison of one of amounts of change per unit time, variances, and maximum values and minimum values of the water level $D_1$ and the water level $D_2$.

4. The water amount measurement device as claimed in claim 1, wherein the processor computes a flow velocity F based on $F=\beta/T$, where T denotes an average generation period of pulses of the first signal component generated by the reflection from the liquid bottom, and $\beta$ denotes a proportionality constant.

5. The water amount measurement device as claimed in claim 1, wherein the processor computes the distance from the light emitting element to the liquid bottom according to a triangulation measuring method that obtains the distance based on a center of gravity of light reflected by the liquid surface and the liquid bottom and received by the light receiving element, or according to a TOF (Time Of Flight) measuring method that obtains the distance based on a propagation time from a time when the light emitting element emits light until a time when the light is reflected by the liquid surface and the liquid bottom and reaches the light receiving element.

6. The water amount measurement device as claimed in claim 1,
wherein the processor obtains the water level $D_1$ from a difference $V_1(N)-V_0$ in a case in which the first signal component is included in the output signal of the light receiving element, using an average value $V_1(N)$ of the upper envelope of the distance data obtained based on the output signal of the light receiving element, and obtains an average value Au of the water level $D_1$ and a variance Du per unit time of the water level $D_1$, and
wherein the processor obtains the water level $D_2$ from a difference $V_0-V_2(N)$ in a case in which the second signal component is included in the output signal of the light receiving element, using an average value $V_2(N)$ of the lower envelope of the distance data obtained based on the output signal of the light receiving element, and obtains an average value Ad of the water level $D_2$ and a variance Dd per unit time of the water level $D_2$.

7. The water amount measurement device as claimed in claim 6, wherein the processor determines, as a true water level indicating a more stable value, a water level D computed from {Au×c1} that is obtained by correcting the average value Au by a correction value c1 when Du<=Dd, and a water level D computed from {Ad} or [{(Au×c1)+Ad)}/2] when Du>Dd.

8. The water amount measurement device as claimed in claim 1, wherein a plurality of light receiving elements are arranged on at least one side of the light emitting element.

9. The water amount measurement device as claimed in claim 8, wherein the plurality of light receiving elements are formed by a line sensor or an image sensor including one of a PD (Photo-Diode), an APD (Avalanche Photo-Diode), a PSD (Position Sensitive Detector), and a CCD (Charged Coupled Device).

10. The water amount measurement device as claimed in claim 1, wherein at least one light receiving element is provided on a plurality of sides of the light emitting element.

11. The water amount measurement device as claimed in claim 1, wherein a plurality of light receiving elements are arranged to surround the light emitting element.

12. The water amount measurement device as claimed in claim 11, wherein the plurality of light receiving elements are arranged concentrically with respect to the light emitting element.

13. The water amount measurement device as claimed in claim 1, further comprising:
a first lens configured to irradiate a light spot of the light emitted from the light emitting element on the liquid surface: and
a first optical filter configured to obtain a specific wavelength or polarization of the light irradiated via the first lens.

14. The water amount measurement device as claimed in claim 13, further comprising:
a second optical filter configured to obtain the specific wavelength or polarization of the light from the light reflected by the liquid surface and the light reflected by the liquid bottom at the bottom surface within the pipeline; and
a second lens configured to image incident light via the second optical filter on the light receiving element.

15. The water amount measurement device as claimed in claim 1, further comprising:
a communication device configured to notify at least the water level to an external device via cable or wireless communication.

16. A water amount measuring system comprising:
a water amount measurement device configured to measure a water level of a liquid flowing within a pipeline, including
a light emitting element configured to irradiate light on a liquid surface of the liquid;
a light receiving element configured to receive light reflected by the liquid surface and light reflected by a liquid bottom of the liquid at a bottom surface within the pipeline;
a storage configured to store a distance $V_0$ from the light emitting element to the liquid bottom within the pipeline; and
a processor configured to compute a water level $D_1$ using $V_1-V_0$, where $V_1$ denotes a distance represented by an average value of an upper envelope of distance data obtained based on an output signal of the light receiving element, when a comparison result of the distance data and the distance $V_0$ at a time of measuring the water level includes a first signal component corresponding to a distance exceeding the distance $V_0$ generated by the reflection from the liquid bottom within the pipeline, and compute a water level $D_2$ using $V_0-V_2$, where $V_2$ denotes a distance represented by an average value of a lower envelope of the distance data, when the comparison result includes a second signal component corresponding to a distance less than the distance $V_0$ generated by the reflection from the liquid surface; and
a server that is notified of measurement information including at least the water level from the water amount measurement device and aggregates the measurement information,
wherein a distance sensitivity of the light receiving element for a case in which the reflection from the liquid surface occurs is approximately ⅓ that for a case in which the reflection from the liquid bottom occurs, and the processor computes the water level $D_1$ based on $(V_1-V_0)\times 3$, and computes the water level $D_2$ based on $(V_0-V_2)$.

17. The water amount measuring system as claimed in claim 16, wherein the water amount measurement device is provided at a plurality of locations, and the water amount measurement device at each of the plurality of locations notifies at least the water level to the server by wireless communication.

* * * * *